(12) United States Patent
Hiemer et al.

(10) Patent No.: US 10,580,229 B2
(45) Date of Patent: Mar. 3, 2020

(54) METHOD FOR DETERMINING OPERATING CONDITIONS OF A WORKING MACHINE COMPRISING A VEHICLE DRIVE TRAIN WHILE OPERATING THE WORKING MACHINE

(71) Applicant: ZF Friedrichshafen AG, Friedrichshafen (DE)

(72) Inventors: Marcus Hiemer, Meckenbeuren (DE); Robin Cramer, Tübingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 72 days.

(21) Appl. No.: 15/785,508

(22) Filed: Oct. 17, 2017

(65) Prior Publication Data
US 2018/0114381 A1    Apr. 26, 2018

(30) Foreign Application Priority Data

Oct. 21, 2016    (DE) .................. 10 2016 220 763

(51) Int. Cl.
*G07C 5/08*     (2006.01)
*G06N 20/00*    (2019.01)
*E02F 9/26*     (2006.01)

(52) U.S. Cl.
CPC .............. *G07C 5/0808* (2013.01); *E02F 9/26* (2013.01); *G06N 20/00* (2019.01)

(58) Field of Classification Search
USPC ......................................... 701/32.9
See application file for complete search history.

(56) References Cited

U.S. PATENT DOCUMENTS

| | | | | |
|---|---|---|---|---|
| 2005/0034913 A1* | 2/2005 | Dahl | ...................... | B60K 28/04 180/272 |
| 2008/0202468 A1* | 8/2008 | Grill | ...................... | E02F 9/2235 123/339.14 |
| 2009/0029826 A1* | 1/2009 | Eguchi | ...................... | B60T 7/02 447/39 |
| 2012/0057956 A1* | 3/2012 | Shirao | ...................... | E02F 3/432 414/707 |
| 2013/0041561 A1* | 2/2013 | Asami | ................... | E02F 9/2246 701/50 |
| 2013/0253783 A1* | 9/2013 | Gratton | ................... | F16H 61/66 701/51 |
| 2014/0343697 A1* | 11/2014 | Kuipers | ................. | B62D 6/008 700/85 |
| 2015/0139767 A1* | 5/2015 | Moriki | .................. | E02F 9/2066 414/699 |
| 2016/0033033 A1* | 2/2016 | Komatsu | ................. | B60K 35/00 74/473.19 |
| 2016/0208665 A1* | 7/2016 | Koike | ................... | F02D 41/029 |
| 2017/0174217 A1* | 6/2017 | Kuhn | .................... | B60W 10/02 |
| 2017/0372534 A1* | 12/2017 | Steketee | .............. | G06Q 10/087 |

* cited by examiner

*Primary Examiner* — Tyler D Paige
(74) *Attorney, Agent, or Firm* — Davis & Bujold PLLC; Michael J. Bujold

(57) ABSTRACT

A method for determining operating conditions of a working machine (2) having a vehicle drive-train (1) while the working machine (2) is operating. The operating conditions are determined by a classifier generated by a machine learning process. By way of the classifier, the values of at least one operating variable of the vehicle drive-train (1), determined while the working machine (2) is operating, can be assigned to respective predefined categories which, in each case, represent at least one operating condition of the working machine.

22 Claims, 13 Drawing Sheets

METHOD FOR DETERMINING OPERATING CONDITIONS OF A WORKING MACHINE COMPRISING A VEHICLE DRIVE TRAIN WHILE OPERATING THE WORKING MACHINE

This application claims priority from German patent application serial no. 10 2016 220 763.6 filed Oct. 21, 2016.

FIELD OF THE INVENTION

The invention relates to a method for determining operating conditions of a working machine that comprises a vehicle drive-train while the working machine is in operation.

BACKGROUND OF THE INVENTION

For the control of a transmission of a vehicle drive-train of a working machine, it is essential to know the driving situation of the working machine. If the driving situation is known, then with this knowledge the control strategy can be adapted. For example, in mobile construction machines frequently recurring production cycles are used. Since particular driving situations often recur after a certain time, it is for example sought to implement measures in the control strategy that aim to reduce fuel consumption, such as operating the engine in a consumption-optimized condition of the engine performance characteristic or, alternatively, reducing the engine speed, or suchlike.

Since important information for controlling the transmission of a working machine, such as the loading condition of the scoop of a wheel loader, is not available, it is sought to determine such information on the basis of values of operating variables in such transmissions established by measurement techniques. For that purpose it is usual to assign driving conditions of working machines to categories in which the values determined are differentiated and classified by specialists. In order to be able to classify working machine transmission values determined during the operation of the working machine, with a view to determining a current operating condition with the high reliability desired, the values determined are assigned to the categories with the help of a separation line or by means of a separation characteristic stored in the control unit. If the measured value lies above the separation line, then it belongs to a category for example associated with a loaded condition of a scoop of the working machine such as a wheel loader. But if the value lies below the separation line, then for example this corresponds to a driving condition of the working machine when its scoop is unloaded.

In such so-termed separation problems, in practice it is customary to use performance graphs or characteristics determined empirically by application engineers.

In this context the indicators or features with reference to which the current driving condition is deduced are not known a priori. Furthermore, the quality of the separation lines or separation surfaces used in each case is unclear. It is not clear whether the separation line or surface stored has been selected more or less arbitrarily, or whether it is truly the best possible separation line or surface.

Moreover, human users can interpret with ease separation lines up to at most the second dimension. Separation problems with higher dimensions can no longer be dealt with by application engineers to the desired extent, and for that reason an exact classification of information derived from the plethora of transmission-internal data cannot be achieved with sufficient accuracy to enable the current driving condition of a working machine to be described in an optimum manner.

SUMMARY OF THE INVENTION

Accordingly, the purpose of the present invention is to make available a method by means of which operating conditions of a working machine that comprises a vehicle drive-train can be determined with the desired high accuracy in a simple manner.

According to the invention, this objective is achieved by a method having the characteristics specified in the independent claims. Advantageous features of the method are the object of the dependent claims. Furthermore, to achieve the objective a working machine is proposed, which is designed to carry out the method according to the claims and benefit from the advantageous features of the method, in particular in accordance with the dependent claims. The possibility also exists of carrying out the method according to the invention in the area of any control device of the working machine functionally connected to the control system of the vehicle drive-train, especially in the area of a transmission control unit, or even in the area of an external control device.

In the method according to the invention for determining operating conditions of a working machine that comprises a vehicle drive-train during the operation of the working machine, the operating conditions are determined by means of a classifier that is generated by a machine learning process, by way of which values of at least one operating variable of the vehicle drive-train determined while the working machine is in operation can be assigned to respective predefined categories which in each case represent at least one operating condition of the working machine.

Classification of the vehicle condition takes place by means of the method according to the invention only on the basis of existing operating data of the vehicle drive-train. Here the possibility exists of carrying out the vehicle condition classification as a function of values of the transmission drive output torque, the transmission drive input torque, the transmission's input rotational speed, the transmission's drive output rotational speed, the drive output rotational speed gradient and the engine torque of the vehicle drive-train of the working machine, and also as a function of a gear ratio engaged in the transmission and a gear ratio change, rotational speed changes within the transmission, rotational directions of particular transmission components, shift conditions of shifting elements of the transmission, and histories of the aforesaid variables, such as integrals, average values, window integrals and the like.

The method according to the invention now offers the possibility of determining with little effort, from among the plethora of transmission-internal information and information from other components of the vehicle drive-train, exactly that information which best describes the current driving condition of a working machine.

In this, the desired exact classification of operating data of a vehicle drive-train no longer has to be limited to two dimensions. By means of the method according to the invention more complex separation problems in higher dimensions can be dealt with by concurrently taking into account as much information as possible with a required accuracy.

In a variant of the method according to the invention that has recourse to expert knowledge, empirically determined values that characterize the operating parameters to be determined in each case during the operation of the working machine are assigned to predefined categories that correspond to the operating conditions to be determined, and the classifier is determined by means of the machine learning process on the basis of the empirical classification of the values. In this way, in a learning step carried out offline existing training data are first divided among the categories to be classified.

If the Support-Vector-Machine (SVM) method is used to determine the classifier, separation problems of almost any dimension can be solved efficiently and the optimum solution is always found.

It is of course at the discretion of the specialist to use other suitable machine learning methods, such as neuronal networks or nearest-neighbor classifiers for determining the classifier.

When a linear separation problem arises, in a simply implemented variant of the method according to the invention, by means of the SVM-method and as a function of the empirical values a classification model optimized for carrying out the division of the empirical values into the predefined categories is determined in accordance with the relationship expressed by the following formula:

$$f(x) = \sum_{i=1}^{N} y_i \alpha_i x_i * x + b$$

in which:
$y_i$=Category membership of a training datum
x=Value of the at least one operating variable of the vehicle drive-train to be classified online
$x_i$=Support vector
N=Number of support vectors
$\alpha_i$=Lagrange factor
b=Bias Alternatively to the above, in an also simply implemented variant of the method according to the invention, when a non-linear separation problem arises, by means of the SVM-method and as a function of the empirical values a classification model optimized for carrying out the division of the empirical values into the predefined categories is determined in accordance with the relationship expressed by the following formula:

$$f(x) = \sum_{i=1}^{N} y_i a_i k(x_i, x) + b$$

in which:
$k(x_i, x)$=Kernel
$y_i$=Category membership of the training datum
x=Value to be classified online
$x_i$=Support vector
N=Number of support vectors
$\alpha_i$=Lagrange factor
b=Bias In this context it can be provided that as the kernel a standard kernel function such as a polynomial kernel, a sigmoidal kernel or a radial basis kernel is used.

A radial basis kernel is described mathematically as $$k(x_i, x) = e^{\left(-\frac{\|x-x_i\|^2}{2\sigma^2}\right)}$$

wherein the term σ represents the width of the Gaussian bell, which can be enlarged or reduced by the quotient $2\sigma^2$. The expression $\|x-x_i\|$ represents the distance of the value of the at least one operating variable of the vehicle drive-train to be classified online from all the support vectors $x_i$.

It can also be provided that by means of the SVM-method and as a function of the empirical values a combination of characteristics of operating variables of the vehicle drive-train is determined for the classifier, by means of which the division of the empirical values into the predefined categories can be carried out by means of the classification model in an optimum manner.

Such characteristics are for example values generated from measured signals, which can be determined from the signals by averaging, integration, differentiation, window integration and suchlike.

In a further variant of the method according to the invention, measured variables determined and the characteristics determined by the means described above are combined with one another by permutation and used for the training. In this case it can additionally be provided that rigor factors and the kernel size σ are varied. In that way different Support-Vector-Machines can be calculated for the various combinations of characteristics, such that the results of this procedure represent a model in each case.

Part of the measurement data set can be reserved for testing the models determined and not for the training. With reference to the tests using these data the quality of the models found is determined. Criteria for the quality can be for example the percentage of correctly classified test data points or the number of support vectors required for the separation problem, and other suitable specifications.

In a further variant of the method according to the invention that can be carried out with little effort, the combination of characteristics determined and the support vectors that represent the characteristic sizes of the classifier can be stored in a non-volatile memory of a control unit of the vehicle drive-train in addition to the category membership $y_i$ determined, the Lagrange factors $\alpha_i$ and the kernel sizes σ that represent the model.

Alternatively, in a variant of the method according to the invention the combination of characteristics determined and the separation line, separation surface or hyper-plane determined by the SVM-method are stored in the non-volatile memory of a control unit.

If wrong classifications caused by shifting of the boundaries determined by the SVM-method between the predefined categories are taken into account, then in the case of separation problems that cannot be solved with the desired high level of accuracy, tolerable classification errors are permitted, while classification errors that cannot be tolerated during the operation of the working machine are avoided with little effort.

During the operation of a working machine, in order to keep computation capacity related running times required for implementing the method according to the invention as short as possible, the classifier is only activated while the working machine is in operation when a defined driving situation of the working machine arises.

Classification errors can be avoided with little effort if, in a further variant of the method according to the invention, a probability is first determined for the classification carried out by means of the classifier and this is then evaluated, so that depending on the evaluation of the probability the final assignment of the value of the operating variable of the vehicle drive-train to one of the predefined categories is carried out.

A working machine can be operated in the desired way in a simple manner when, with reference to the value of the operating variable, a working machine built with a wheel loader function is determined by means of the classifier during its operation to have a loaded or unloaded operating condition of a scoop of the working machine while driving in reverse or while driving forward at the beginning of a reversing process, during a steady acceleration phase and/or during a steady deceleration phase of the working machine.

If by way of the classifier the insertion of the scoop of a working machine designed with a radial loader function into a mound of bulk material can be determined, then with little effort countermeasures to avoid stalling of the working machine can be activated highly spontaneously.

In a further variant of the method according to the invention, by means of the classifier, filling of the scoop from the mound of bulk material is determined in order, in a simple manner, on the one hand to operate the working machine in operating ranges with suitable consumption characteristics and, on the other hand, to make available sufficient drive power for its operation.

If after leaving the mound, the loading condition of the scoop can be determined by the classifier, then again with little effort it can be checked whether the scoop is actually loaded, or only pushed into a mound, or whether after having been filled it has been unloaded again. This procedure in turn ensures that the working machine is being operated in a manner best adapted to the current operating condition.

When an unloaded condition of the scoop is recognized while at the same time the working machine is being driven forward, if classifiers are activated by means of which during an acceleration, a deceleration or during a reversing process of the working machine it can be checked whether the scoop is in the unloaded or the loaded operating condition, whereby if a loaded operating condition of the scoop is recognized the operating condition of the working machine classified as unloaded is reclassified as loaded, then in a simple manner a working machine can be operated in the desired manner.

In a further advantageous variant of the method according to the invention, when an unloaded condition of the scoop is recognized while at the same time the working machine is being driven forward, classifiers are activated, in order to detect whether the scoop, during the forward movement, is being inserted into a mound or a filling process of the scoop of the working machine is taking place during such a forward movement up the mound, and in order in a simple manner to be able to operate the working machine in the desired manner.

When by means of a classifier it is recognized that a working machine is moving forward and up a mound and this operating condition is continually checked by the classifier, and by means of a further activated classifier, in turn with reference to the values of the at least one operating variable of the vehicle drive-train of the working machine, it is monitored whether the scoop is being filled, then the decision to operate the working machine appropriately in the operating condition for driving up the mound or the operating condition for filling the scoop can be implemented in a simple manner with the desired high security and with great precision.

If classifiers are activated during a recognized scoop loading process while the working machine is driving forward, in order to detect whether the scoop is still being loaded in the forward direction or whether the filling process has been terminated by reversing and the scoop is loaded or unloaded, again a working machine can in a simple way be operated in the manner desired.

In that way, during the operation of a working machine the decision can be reached with little effort about whether or not the working machine is in the scoop full operating condition, and the working machine can be operated in the manner required. In addition, if it is recognized that the working machine is not in the scoop full operating condition, it is possible to obtain information about whether before moving away the vehicle was still actively operating on the mound and the scoop is therefore full, and to determine the loaded operating condition of the scoop of the working machine at the same time as the working machine is reversing. If by means of the classifier provided for the purpose and activated, it is recognized, while the working machine is operating in reverse, that the scoop is unloaded, then the working machine is operated appropriately for that operating condition.

Furthermore, in a further variant of the method according to the invention that can be carried out with little effort, during a recognized scoop loading process while the working machine is driving forward, classifiers are activated in order to recognize whether the scoop should be loaded some more in the forward driving direction or the filling process in the forward direction has ended and the scoop is loaded or unloaded.

If the scoop is recognized to be full while the working machine is reversing and classifiers are activated in order to check whether the scoop is actually full, or in order to determine whether during an acceleration, a deceleration or during a reversing process of the working machine the scoop of the working machine is in an unloaded condition, again in a simple way the working machine can be operated in a manner adapted to the current operating condition of the working machine.

In that case, by virtue of the activated classifiers and as a function of the driving situation—acceleration, deceleration or reversing—it can be checked with little effort whether the currently determined loaded operating condition of the scoop at the same time as the working machine is reversing has been determined to the correct extent, or whether the scoop is in its unloaded condition.

In another advantageous variant of the method according to the invention, when the scoop is recognized as being loaded while the working machine is driving forward classifiers are activated in order to check during an acceleration, a deceleration or a reversing process of the working machine whether the scoop is actually full, or in order to determine whether during an acceleration, a deceleration or a reversing process of the working machine, the scoop of the working machine is in an unloaded operating condition.

When the scoop is recognized to be full while the working machine is driving forward, if classifiers are activated in order to check during an acceleration, a deceleration or during a reversing process of the working machine whether the scoop is actually full, and to determine whether the working machine is being operated in the forward driving direction with its scoop loaded or whether loading of the scoop is taking place, again in a simple way the working machine can be operated in a manner adapted to the current operating condition of the working machine.

In this case, depending on the driving situation it can be evaluated by virtue of the currently activated classifiers whether the currently determined loaded condition of the scoop at the same time as the working machine is driving forward has actually been recognized correctly, or whether the scoop is still empty. Furthermore, an operating condition progression of the working machine during which the working machine with its scoop full is still driving into the mound can be monitored and the working machine can be operated in an optimum way while entering the mound. Correspondingly however, the working machine can also be operated in a manner appropriate for a loading process currently taking place. If the filling of the scoop is accompanied by a usual ascent of the mound, during which for example a marked drive output deceleration occurs, this is recognized by one of the activated classifiers and the working machine is actuated in a manner adapted to the mound-climbing operating mode. If the working machine is moved onto the mound by the driver at a low driving speed or cautiously without the operating variables of the vehicle drive-train changing to the values that characterize driving up a mound, the working machine is operated as befits the scoop filling operating condition.

If, with the scoop loaded while the working machine is driving ahead, classifiers are activated and when a reversing process of the working machine is determined, unloading of the scoop is recognized, then in a simple way the working machine can be operated in the desired manner with high spontaneity and as a function of the operating condition existing at the time.

In a further advantageous variant of the method according to the invention, if it is recognized that the scoop is unloaded while the working machine is driving in reverse, classifiers are activated in order to check whether the scoop is actually unloaded, and in order to determine whether an acceleration, a deceleration or a reversing process of the working machine with its scoop full is being carried out.

Starting from a detected unloaded operating condition of the scoop at the same time as the working machine is reversing, with the help of the activated classifiers and depending on the driving situation, i.e. whether the working machine is accelerating, decelerating or driving in reverse, it is decided whether the operating condition of the working machine has actually been classified correctly, or whether the working machine is reversing with its scoop full. This results from the fact that the driving direction change of the working machine starting from the forward direction to the reversing direction can also take place with a full scoop instead of emptying the scoop during the reversing process.

In advantageous variants of the method according to the invention the driving condition classification takes place purely from existing data, whereby these are data-driven. In a learning step carried out offline, the existing training data are for example divided among the categories to be classified and during this step, depending on the dimension of the separation problem concerned, a separation line, a separation surface or a so-termed hyper-plane is calculated, as necessary. A representation of the separation line, separation surface or hyper-plane is used in a control unit, and classifies the driving situation online in the vehicle.

Both the features of the object of the invention indicated in the claims and those emerging from the following example embodiments, whether taken in isolation or in any combination with one another, are in each case appropriate further developments of the object.

BRIEF DESCRIPTION OF THE DRAWINGS

Further advantages and advantageous embodiments of the object of the invention emerge from the claims and from the example embodiments whose principle is described below with reference to the drawing. In the description of the various example embodiments, for the sake of clarity the same indexes are used for structurally and functionally equivalent components.

The figures show:

FIG. 4: A more detailed flow chart of the procedure upon which FIG. 3 is based;

FIG. 9: A more detailed block representation of the online driving situation determining mode of the variant upon which FIG. 8 is based;

DETAILED DESCRIPTION OF THE PREFERRED EMBODIMENTS

Figure 1:
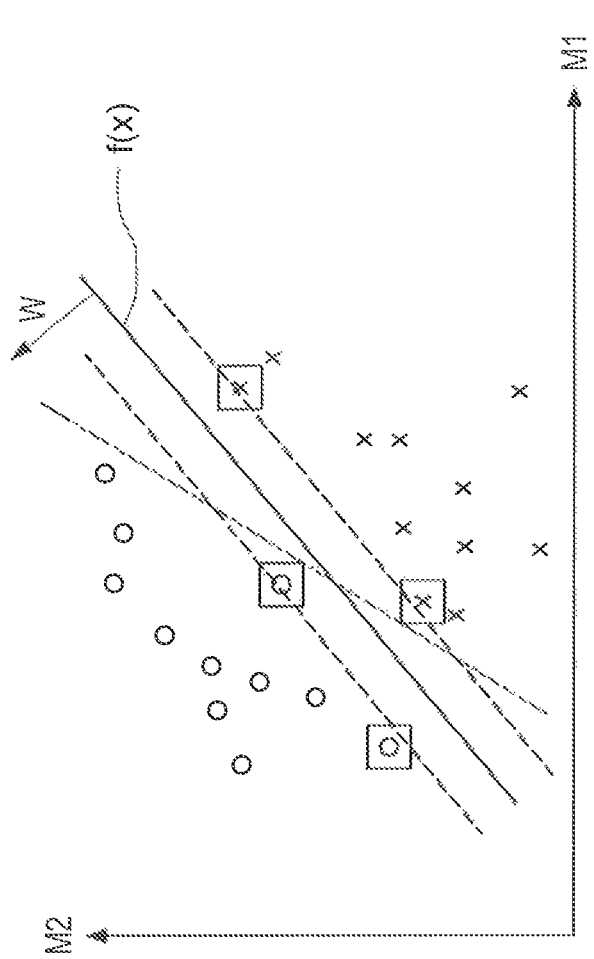
FIG. 1: A graphical representation of an operating range of a vehicle drive-train of a working machine extending between two operating variables, and a separation line, by means of which the current operating conditions of the working machine can be determined by classification of the values of the operating variables into predefined categories.

FIG. 1 shows a graphical representation of an operating range of a vehicle drive-train of a working machine, the range extending between two operating variables M1 and M2, and a separation line f(x) by means of which the current operating conditions of the working machine can be assigned to predefined categories by the classification of values of the operating variables M1 and M2. The driving situation classification takes place purely from existing data, and is thus data-driven. In a learning step carried out first offline, existing training data are divided among the categories to be classified and in this step the separation line f(x) is calculated. A representation of the separation line f(x) is used in a control unit of the vehicle drive-train, for example in the transmission control unit, with reference to which the classification of the driving situation of the working machine during the operation of the working machine is carried out.

Data-driven classification methods are referred to as machine learning methods. Examples of machine learning methods are neuronal networks or nearest-neighbor classifiers. The method described in what follows is known as the Support-Vector-Machine (SVM) method.

The SVM-method provides a linear classifier whose separation line has the mathematical form:

$$f(x) = w^T x + b \quad \text{Equation (1)}$$

When correspondingly suitable training data for a driving situation classification are available, then by means of the SVM-method precisely that line can be determined by the representation which has the maximum distance between the data points to be separated.

The circles shown in FIG. 1 describe the first category, which is assigned to the operating condition "Scoop not full" of a working machine in the form of a wheel loader. The values assigned to the second category and denoted by crosses in FIG. 1 are assigned by the classification to the "Scoop full" operating condition of the wheel loader.

The operating variables M1 and M2 plotted on the axes represent two features, such that the feature M1 can correspond to the drive torque and the feature M2 to the standardized drive output rotational speed. Furthermore, in FIG. 1 two separation lines are shown. One of the separation lines is shown as a thin, dot-dash line whereas the second representation of the separation line is in the form of a continuous line and is the optimum separation line determined by the SVM-method with a maximum distance to the values of the two categories. Here, the maximum distance is indicated symbolically by the distance between the two more heavily drawn broken lines.

Basically, finding the optimum line or separation line for separating the categories is a standard mathematical problem which is known as the quadratic problem with linear boundary conditions. It can be solved efficiently and always yields the optimum solution.

The weighting vector w from equation (1) is equivalent to the term (1), $$\sum_{i=1}^{N} y_i \alpha_i x_i$$

which comes from the so-termed dual optimization problem. By inserting the term (1) into equation (1), we obtain equation (2):

$$f(x) = \sum_{i=1}^{N} y_i \alpha_i x_i * x + b$$

The formula terms in equation (2) are as follows:
$y_i$=category membership of the training datum i (e.g. 1="Scoop full", −1="Scoop not full")
x=unknown value (new=to be classified online)
$x_i$=Support vector
N=Number of support vectors
$\alpha_i$=Lagrange factors
b=Bias In FIG. 1 the support vectors are indicated in each case by the squares surrounding the circles and crosses, and represent in each case the value with the smallest distance from the separation line f(x). These support vectors constitute the most important data in the training data set and alone describe the separation line f(x) found and represented by the continuous line in the above figure. Thus, during the training, in preferred variants of the method according to the invention the separation line is not determined, but rather, precisely these support vectors. The separation line is therefore also not stored in the control unit, but only the support vectors are stored. Accordingly, the data to be classified online are only evaluated in relation to the support vectors.

At higher dimensions a complex separation surface has to be stored in the control unit, which takes up a lot of memory. Also increasing with the dimension of the problem is the complexity for evaluating in the control unit a point to be classified. On the other hand, when the support vector is used the point to be classified only has to be evaluated in the control unit in relation to the support vector.

The Lagrange factors $\alpha_i$ are equal to zero for all the data points except for the support vectors. The result is that equation (2) is evaluated exclusively for the support vectors and all other values shown in FIG. 1 and assigned to the two categories are inconsequential for the separation problem.

With most real separation problems, however, the points in the two categories cannot be separated completely by one simple function. There is then no linear space between the categories, in which the separation line is located. In some circumstances a separation of the data points is only possible and would then as a rule also demand carrying out too special a separation. In online use in the control unit this special separation would yield very poor classification results, because it represents only the "memorized" training data.

Figure 2:
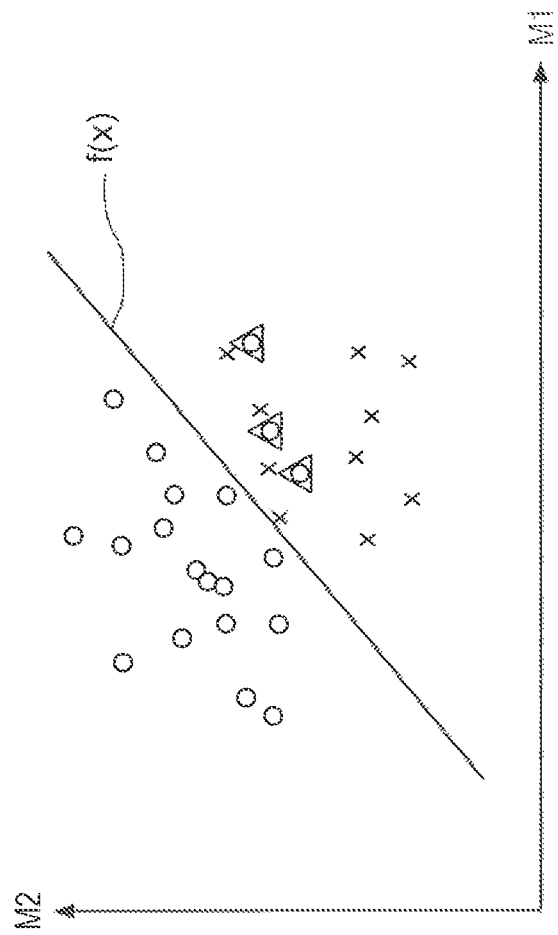
FIG. 2: A representation corresponding to FIG. 1, with a position of the separation line that allows some wrong classifications of some values belonging to one of the categories, whereas the wrong classification of values belonging to the second category is avoided by the position of the separation line.

Accordingly it is allowed for so-termed outlier data, identified in FIG. 2 by triangles, to lie on the side of the separation line f(x) opposite to that of the category to which they belong. However, the equation (2) for the separation line f(x) used until now does not permit any wrong classifications because of secondary conditions of the optimization problem. By introducing so-termed slip variables, wrong classifications are permitted. This is also known as the "soft margin" effect. By a suitable penalization of wrong classifications the number of errors can be limited or the number of errors can be counteracted.

In non-linear separable problems wrong classifications necessarily occur. However, it is often known whether it is more important to recognize a category with certainty at the cost of a few minor wrong classifications of the other category. Referring to the representation in FIG. 2, wrong classifications of the data belonging to the first category, which for example corresponds to the "Scoop full" operating condition of the working machine or wheel loader and whose data in FIG. 2 are denoted by the crosses, are more relevant than data belonging to the second category, which in turn correspond to the "Scoop empty" operating condition of the working machine and are denoted in FIG. 2 by the circles.

This is based on the knowledge that a wrong classification and a consequently false assumption that the scoop is full although the scoop is actually empty, is sometimes brought about by too late a recognition during the very dynamic operating condition of "driving up a mound". In the case of such a wrong classification the operating strategy assumes that a wheel loader with a filled or full scoop will not be driving into the mound. One undesired effect that could arise from this is that a drive unit of the vehicle drive-train of the working machine in the form of an internal combustion engine stalls due to the suddenly applied load while moving up the mound.

To cope with the circumstance that it is more important to recognize a category with certainty, it is possible to shift the separation line found in the direction toward one of the categories by a defined amount. In the example embodiment on which FIG. 2 is based, the characteristic line f(x) is displaced into the area of the second category. The characteristic line displacement can be done with little effort since the wrong classification of the more important first category is more strongly penalized. The optimization algorithm of the SVM-method then automatically determines the shifted characteristic line.

As can be seen from FIG. 2, the values belonging to the second category and identified by triangles are wrong classifications, which in this case necessarily result from the displacement of the characteristic line f(x) toward the second category. The characteristic line f(x) is shifted in order to ensure that all the values of the first category denoted by crosses will be under the separation line f(x) and to guarantee thereby that all the values of the first category are classified correctly. By virtue of the soft margin method and the penalizing of errors differentiated according to categories, with little effort expert knowledge is selectively brought to bear in the determination of the separation line.

Often, the complexity of the problem does not allow a linear separation as shown in FIG. 1 and FIG. 2. The complex, in most cases non-linear problem can be dealt with or solved by using a so-termed kernel or the so-termed "Kernel-Trick". For this, by a transformation of the initial space with the co-ordinates $\underline{x}=(x1, \ldots, xK)$ into a usually higher dimensional picture space $\underline{z}=(z1, \ldots, zM)$ with M>>K, the non-linear separation problem in the initial space is converted into a linear separation problem in the picture space with higher dimensions. There, the problem can again be solved with the algorithm of the quadratic programming. In this way an optimum separation line, but now non-linear in the initial space, or in general a so-termed hyper-plane, can again be determined.

The Kernel-Trick has the advantage that the transformation in the picture space is not carried out explicitly and the calculation itself does not take place in the picture space. For this, so-termed "Kernel Functions" $k(x_i, x)$ are used, which enable all the calculations to be carried out in the initial space again. For non-linear separation problems equation (2) then becomes:

$$f(x) = \sum_{i=1}^{N} y_i \alpha_i k(x_i, x) + b \quad \text{Equation (3)}$$

Here, it is possible to use standard kernel functions such as a radial basis kernel, a polynomial kernel or a sigmoidal kernel.

Basically, the procedure for determining the driving situation of a working machine is independent of the kernel function $k(x_i, x)$ used.

For example, the radial basis kernel is represented by the following mathematical relationship, shown in equation (4):

$$k(x_i, x) = e^{\left(-\frac{\|x-x_i\|^2}{2\sigma^2}\right)} \quad \text{Equation (4)}$$

As can be seen from equation (3), the function according to equation (4) only has to be evaluated for the support vectors $x_i$. For this the distance $\|x-x_i\|$ for each data point x is weighted relative to all the support vectors $x_i$ in order to evaluate a Gauss bell $$e^{\left(-\frac{\|x-x_i\|^2}{2\sigma^2}\right)}.$$

The width of this Gauss bell can be increased or reduced by means of the quotient $2\sigma^2$. Smaller σ-values enable more strongly curved separation lines while larger σ-values give "straighter" separation lines. More strongly curved separation lines adapt very well to the training data and straighter separation lines are more generalized and are often more robust with unknown test data.

During a training process carried out offline, with the classifiers to be determined by the SVM-method there are associated various combinations of training characteristics which previously had to be assigned manually to the first or to the second category. Usually, for the training, part of the training data available are also used for testing the classifier in order to check the quality of the classification in the process of a so-termed cross-validation. At the end it is assessed how good the classification of the separation line found was for the untrained test data. If various combinations of characteristics are gone through, then the best possible combination of characteristics for the separation problem currently under consideration as well as the number of characteristics needed are determined.

Thereafter, the support vectors determined are transferred into the non-volatile memory of the control unit concerned. In the control unit, during the operation of the working machine only equation (3) with the kernel function according to equation (4) are evaluated. The support vectors $x_i$ have already been determined during the training and transferred into the control unit during application, as also the best possible combination of characteristics (M1 M2, . . . , Mn) for the separation problem.

Figure 3:
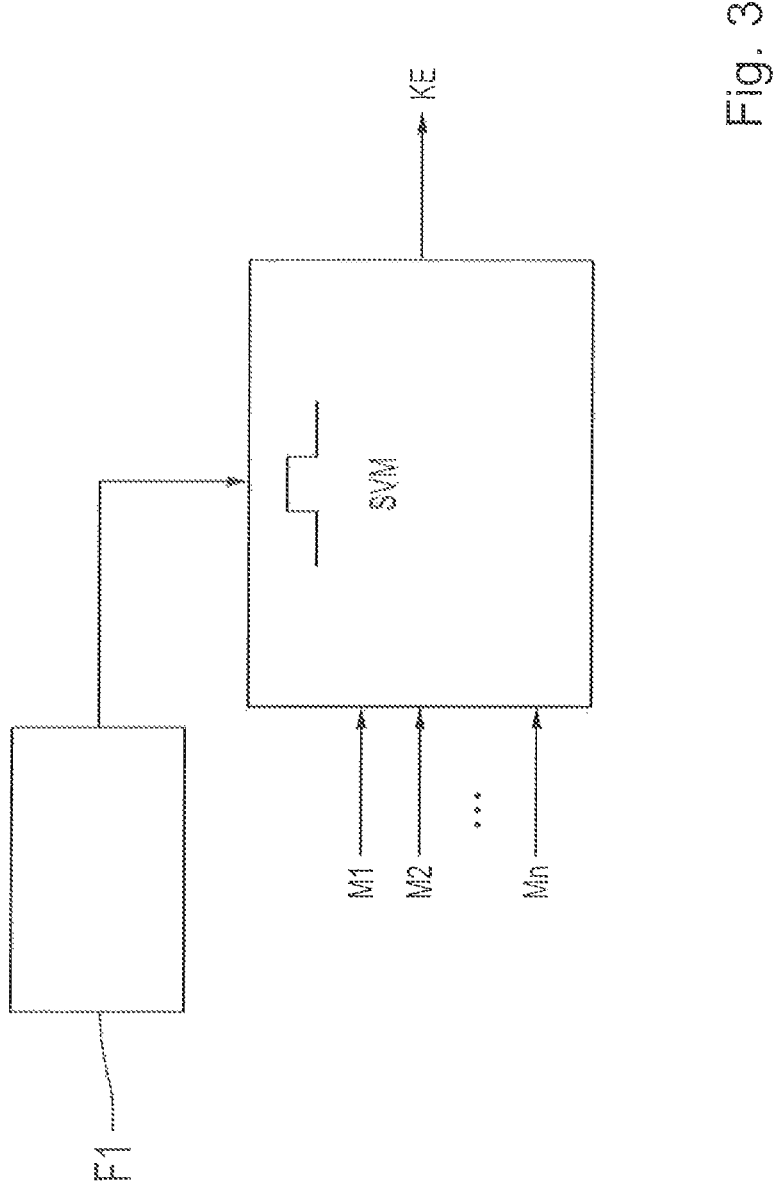
FIG. 3: A simplified block diagram of a variant of the procedure according to the invention for determining the current operating condition of a working machine while the working machine is in operation.

In this case the support vector machine (SVM) is activated in the manner shown in FIG. 3 by the so-termed recognition or activation function F1. If the SVM-method is not activated, then the classifier determined during offline training is not carried out, for example in order to save running time.

Figure 4:
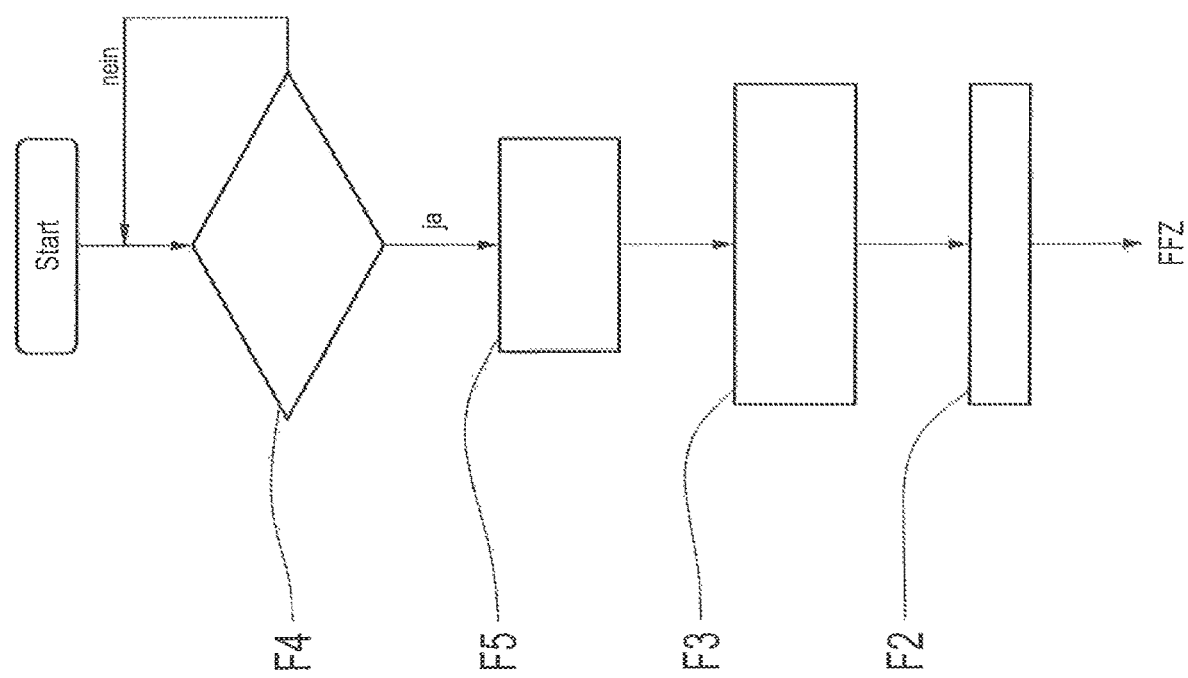

An evaluation function to be carried out during a function block F2 shown in FIG. 4, which is connected downstream from a function block F3, evaluates for example the classification value f(x). For example, the evaluation function could determine the final driving situation only after a certain number of successful, equal classifications and thus the ultimate classification result KE. During the function block F3 the separation line is evaluated in accordance with equation (3), whereas by virtue of a further function block F5 interposed between an interrogation block F4 of the recognition or activation function F1 and the third function block F3, the characteristics in the current computation step are determined.

The variant of the procedure according to the invention described in detail above is basically a method for classifying a driving situation by means of a Support Vector Machine, in which equation (3) is worked out online in the control unit and the classification result KE is used in the algorithm, for example to improve the driving strategy. The parameters $\alpha_i$, $x_i$, $y_i$, σ and the characteristics M1, M2 to Mn are determined in a training process carried out offline. The recognition or activation function F1 decides when the SVM-method should be used for classifying. The evaluation function F2 can filter the classification result KE determined by the SVM, before the final vehicle condition FFZ is established. Besides the possibility of shifting the separation plane by penalizing wrong classifications, by virtue of the procedure the necessary expert know-how can be brought in so that the method is used in the control unit in a robust and efficient manner.

With mobile working machines, recurrent driving cycles are always carried out. The best known of these driving cycles is the so-termed Y-cycle of a wheel loader represented schematically in FIG. 5 in which, in an operating condition Z1, the wheel loader drives up to the bulk material mound with its scoop empty. Then, in an operating condition Z2 the wheel loader moves into the mound. After this, in an operating condition Z3 the scoop is filled from the mound. Again after this, in a further operating condition Z4 the wheel loader drives in reverse away from the mound with its scoop full. Then a reversing process of the wheel loader in the direction of forward driving is called for, such that an operating condition Z6 characterized by driving forward with the scoop full exists. Starting from operating condition Z6, during an additional operating condition Z7 the scoop is unloaded and thereafter, during a further operating condition Z8 with its scoop empty, the wheel loader moves in the reversing direction. After a further reversing process the wheel loader is once more in its initial operating condition Z1 and another Y-cycle begins.

Figure 5:
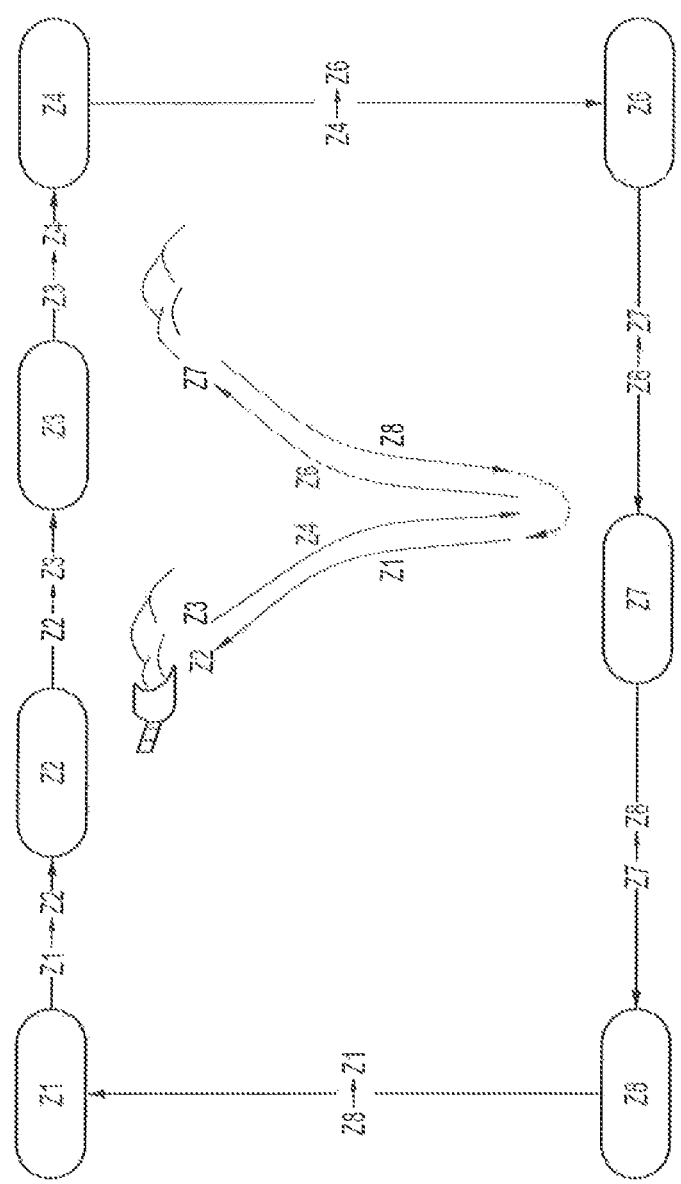
FIG. 5: A schematic condition diagram which a working machine in the form of a wheel loader undergoes during an ideal so-termed Y-cycle.

If a Y-cycle is always carried out in the manner described above, the operating conditions Z1 to Z8 shown in FIG. 5 simply take place one after another starting from top left, clockwise in sequence. But this does not correspond to a real situation and many other driving maneuvers of a wheel loader take place under the driver's control. For example, a driver may only want to pile a mound higher. For this, in operating condition Z1 the driver drives up to the mound and the scoop is first filled. However, still on the mound the load in the scoop is tipped out again higher up the mound. Then the wheel loader with its scoop empty reverses out of the mound. In this case the consecutive operating conditions occur in the sequence Z1, Z2, Z3 and Z8.

Figure 6:
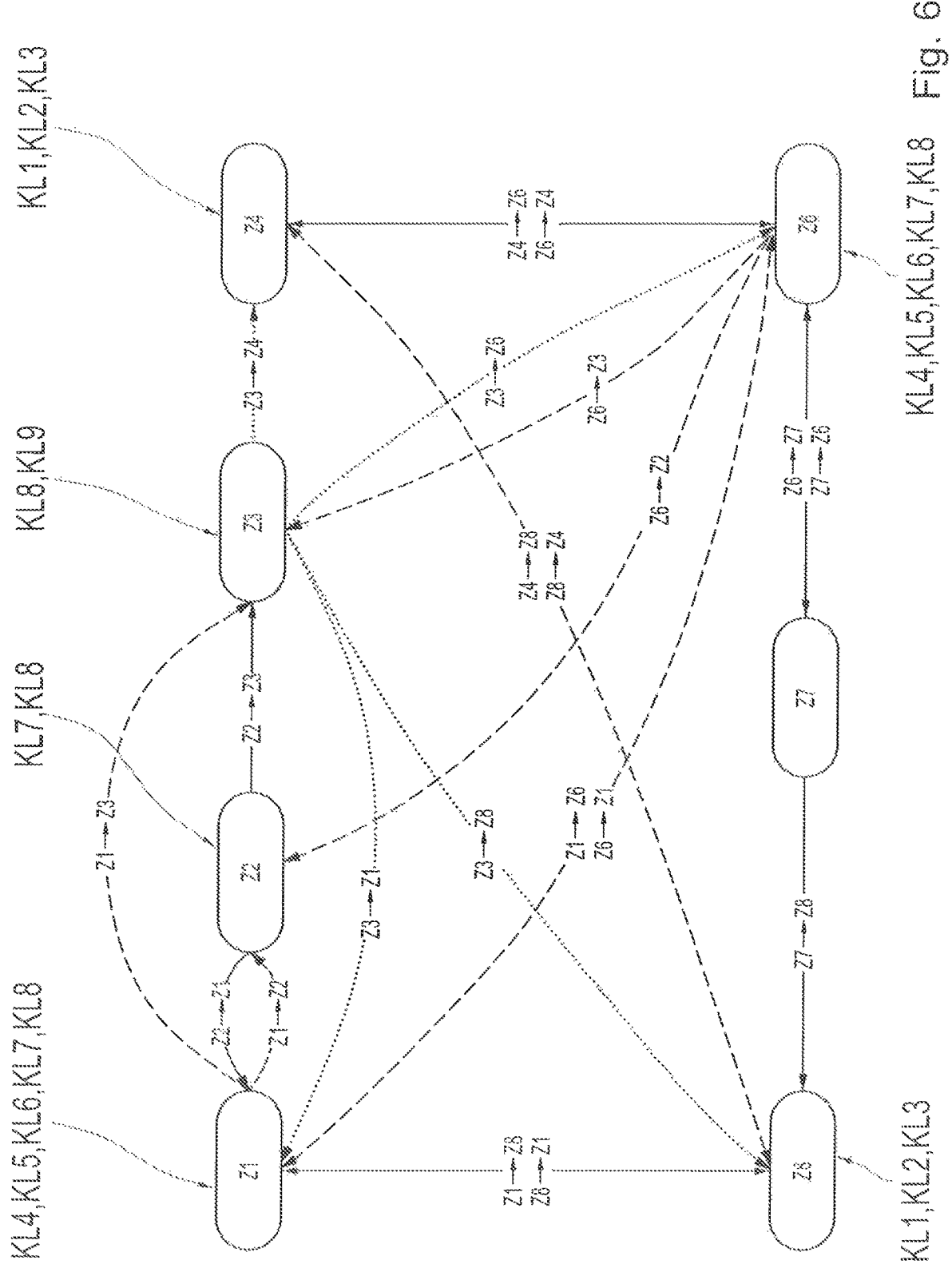
FIG. 6: The condition diagram according to FIG. 5, which in addition to the Y-cycle shows graphically further driving situations of the wheel loader.

It is also conceivable for a normal reversing process to take place without intermediate filling of the scoop, starting from operating condition Z1 by way of operating condition Z8 and back to operating condition Z1. There are many other possible driving situation changes that do not correspond to the previously described condition sequence in the Y-cycle. The possible operating condition interchanges of such a driving machine are illustrated in FIG. 6. The addition of these operating condition changes or crossovers enables the generalization of the Y-cycle described earlier to other driving situations.

The classification of all driving maneuvers of a wheel loader cycle, particularly taking account of deviations from the standard Y-cycle, is possible only with great difficulty for the transmission control system without vehicle know-how. In this context vehicle know-how is understood to mean information concerning the current operating condition of a wheel loader, such as the activity condition of a working hydraulic system, with which the scoop position or the height of the lifting frame can be determined.

If one wishes to determine all the driving conditions without vehicle know-how, then the information available to the transmission must be used as best as possible. This is very difficult with standard methods. For example, it is unclear which characteristics have to be combined with one another and what thresholds have to be set in order to distinguish the possible consequences from one another. For deciding the consequence it is also important to know how high the probability is for the classification of the current condition.

In this connection too the data-driven classification described earlier offers possibilities for improving the recognition of the driving situation of a wheel loader. For all driving condition changes that can only be determined with a lot of effort by means of the usual procedures, FIG. 6 indicates with dotted or broken lines condition shifts carried out. The operating condition changes shown using continuous lines are trivial; for example the operating condition changes between the operating conditions Z4 and Z6 and also between Z1 and Z8 are in each case characterized only by a change in direction to the respective opposite driving direction.

For the recognition of the changes not represented by continuous lines, training-based machine learning methods are again used. The basis of these methods is always that in a learning process carried out offline, on the basis of existing measurement data a classifier is first trained in the manner also described for FIGS. 1 to 4. During the training, on the basis of the training data a separation line, a separation surface or a hyper-plane is determined, which discriminates between the conditions to be classified. In turn, classifiers for determining the condition changes represented by broken or dotted lines are then established, for example by the SVM-method.

Figure 7:
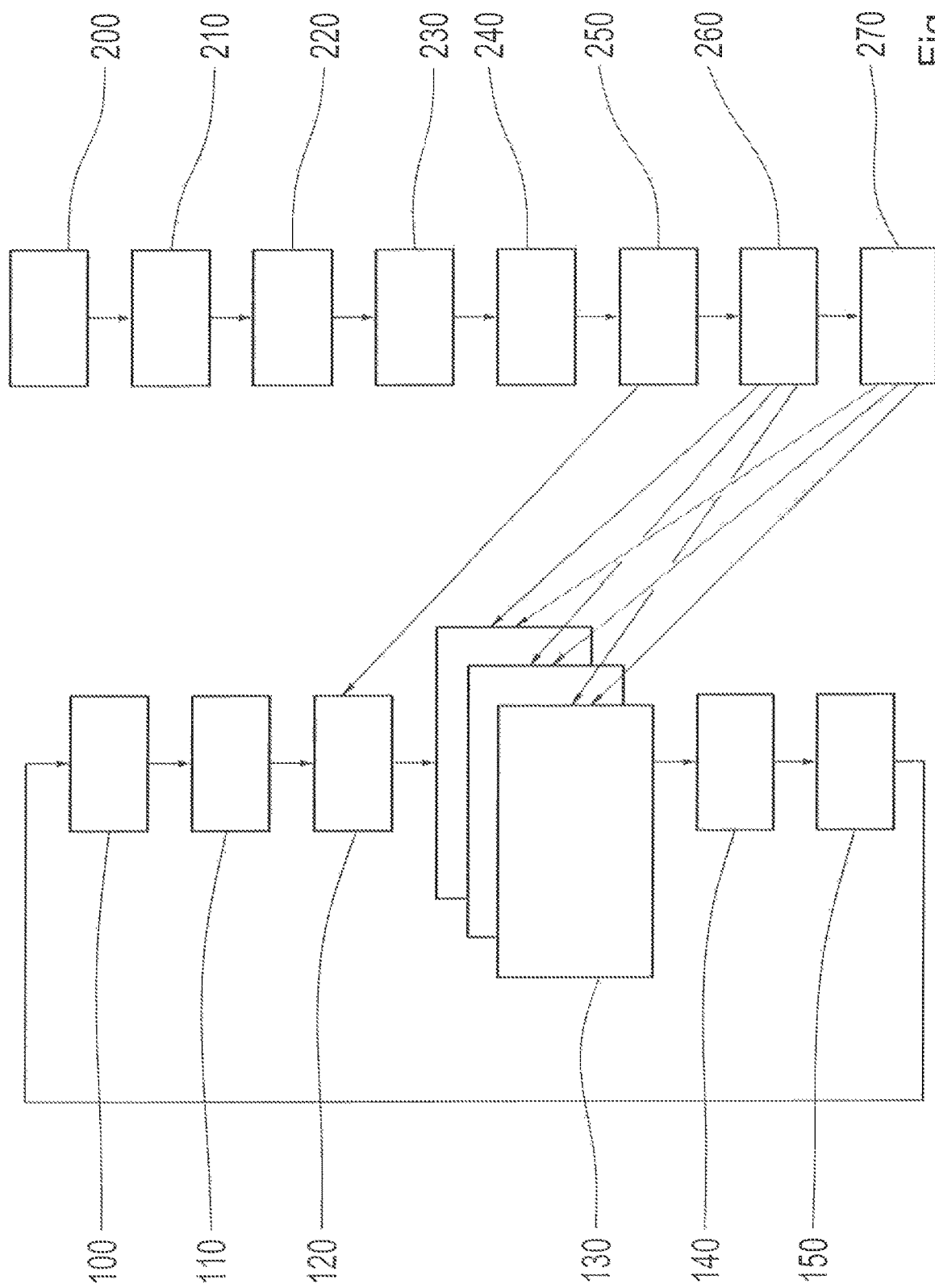
FIG. 7: A block diagram representation of a further variant of the method according to the invention, which also comprises both an offline training mode for determining a classifier and also an online driving situation determining mode that uses the classifier.

First of all the driving situation is determined during a function block 200 shown in FIG. 7, in which the classifier should not be used at all. For this, certain particular easily measurable signals available from the transmission of the drive-train of the working machine or wheel loader are used. For example, the driving speed or the drive output rotational speed, the engine rotational speed and internal status variables such as shifts are used.

In a following step or function block 210, from the total of measurements, those data are picked out which should be used in the driving situation determined by way of the function block 200. These data are then assigned to the associated categories. The rest of the measurement data are ignored.

After this, pre-processing takes place during a further function block 220, in which from the measured signals new characteristics are generated, for example by averaging, integration, differentiation, window integration and the like.

In a further function block 230 all the measured variables and additional characteristics determined are combined with one another by permutation and used for the training. In addition rigor factors and the kernel size $\sigma$ are varied.

In this way various support vector machines are calculated for the different combinations of characteristics. The result of function block 230 corresponds in each case to a model K. Since by means of function block 230 a plurality of combinations are calculated, there are also a plurality of models.

Part of the set of measured data is reserved for a test of the models $K_j$ to be carried out in the area of a function block 240, and not used for the training. With reference to the tests with these data the quality of the model found in each case is determined. Criteria for the quality are for example the numeral percentage of correctly classified test data points or the number of support vectors needed for the separation problem, and other appropriate criteria.

On the basis of the quality criteria and the shape of the hyper-plane determined, the best-suited model is now determined offline in a function block 260 together with the associated optimum combinations of characteristics, by way of a further function block 250.

The training process comprising the function blocks 200 to 260 is carried out for all classifiers. In all, in this case the following nine different classifiers KL1 to KL9 to be described in more detail are used, in order to determine all the aforesaid operating condition changes of a wheel loader to the desired extent and to evaluate them as required.

By means of the first classifier KL1 a loaded or unloaded operating condition of a scoop during a reversing movement of a wheel loader at the beginning of a reversing process is evaluated, while this is taking place by way of the second classifier KL2 during a steady deceleration phase and by way of the third classifier KL3 during a steady acceleration phase. By means of the fourth classifier KL4 a loaded or unloaded operating condition of a scoop on driving forward at the beginning of a reversing process is evaluated, and this is carried out by way of the fifth classifier KL5 during a steady deceleration phase and by way of the sixth classifier KL6 when a steady acceleration phase is recognized. With the help of the seventh classifier KL7 the insertion of the scoop into the bulk material mound can be determined, whereas by means of the eighth classifier KL8 the filling of the scoop from the mound can be evaluated. Finally, by way of the ninth classifier KL9 the withdrawal from the mound can be evaluated and it can be determined whether the scoop is actually full or only a piling higher of a mound is taking place. In addition, by means of the ninth classifier KL9 it can be determined whether after having been filled, the scoop has immediately been emptied again.

In operating condition Z1, the classifiers KL4, KL5, KL6, KL7 and KL8 are activated. Depending on the existing driving situation of acceleration, deceleration or reversing, the classifiers KL4, KL5 and KL6 assess whether the identification of the operating condition Z1 was correct or whether the scoop is in fact loaded. In such a case a correction of the current condition is made and hence a change to operating condition Z6. With the help of the seventh classifier KL7 it can be decided whether a change should be made from unloaded forward driving of the wheel loader to a mound-climbing operating mode that corresponds to operating condition Z2. By means of the eighth classifier KL8 it is determined whether a change to the third operating condition Z3 should be made for the operation of the wheel loader.

If mound-climbing is detected, and therefore in the second operating condition Z2, by way of the activated seventh classifier KL7 it is decided whether to operate the wheel loader in accordance with the second operating mode or, with the help of the eighth classifier KL8, a change of the operating condition mode in the direction of the third operating condition Z3 is needed. If a wrong classification has been made and the wheel loader in condition Z2 immediately becomes faster again, then a change to condition Z1 takes place.

If the wheel loader is in the third operating condition Z3, the eighth classifier KL8 is activated and decides about remaining in the third operating condition Z3. By way of the also activated ninth classifier KL9, on leaving the third operating condition Z3 information is available about whether before leaving the vehicle had still been active on the mound, so that the scoop had been filled. If such is not the case, then a change to the eighth operating condition Z8 takes place. If the scoop is actually sufficiently full, a change to the fourth operating condition Z4 is made. But if in condition Z3, it is recognized that the scoop has not been filled and that the vehicle is for example becoming faster again, then it can be assumed that the working machine is for example driving away over the mound. In that case the system branches back to condition Z1. If in condition Z3 it is recognized that the scoop has been filled and the working machine is leaving the mound in the forward direction, the system branches to condition Z6.

If the fourth operating condition is determined, the classifiers KL1, KL2 and KL3 are activated. Depending on the driving situation, namely acceleration, deceleration or reversing, the classifiers KL1, KL2 and KL3 check whether the fourth operating condition Z4 is actually correct or whether a change should be made from the fourth operating condition Z4 to the eighth operating condition Z8.

If the sixth operating condition Z6 is recognized, then depending on the driving situation at the time, namely acceleration, deceleration or reversing, the then activated classifiers KL4, KL5 and KL6 assess whether the sixth operating condition Z6 is correct or whether the scoop is in fact empty. If the scoop is unloaded, a change to the first operating condition Z1 takes place.

However, starting from the sixth operating condition Z6, the system can also spring back to the third operating condition Z3 if the wheel loader with its scoop full drives back again onto the mound and fills the scoop some more. If this is associated with a classical mound ascent, which for example is indicated by a marked drive output deceleration, then this is recognized by the classifier KL7 and the second operating condition Z2 is first activated. If the driver drives cautiously onto the mound without the features of a usual mound ascent, then the eighth classifier KL8 changes the operating condition of the wheel loader from the sixth operating condition Z6 directly over to the third operating condition Z3.

If the seventh operating condition Z7 of the wheel loader is activated, then the carrying out of a simple reversal is assessed as an indicator for unloading. In contrast, starting from the activated eighth operating condition Z8 and by way of the then activated classifiers KL1, KL2 and Kl3, depending on the existing driving situation of acceleration, deceleration or reversing, it is decided whether the eighth operating condition Z8 has actually been correctly classified or whether a change should be made back to the fourth operating condition Z4. The reversing in the seventh operating condition Z7 could indeed take place with the scoop full instead of emptying the scoop.

The support vectors determined during the training, the ideal combination of characteristics, the Lagrange factors $\alpha_i$ and the kernel k are in turn transferred by the function block 260 to the non-volatile memory of the control unit.

During a computation cycle carried out online in the control unit for the classification of the current operating condition of the working machine, the steps or function blocks 100 to 150, which are explained in more detail below, are passed through.

For example starting from the operating condition Z1 of the working machine, with reference to easily determined signals or operating variables of the working machine such as the drive output rotational speed, the travel direction and suchlike, it is determined in function block 100 whether the working machine is accelerating, decelerating or whether it is in a particular reversing phase. If the working machine is in a steady deceleration phase which the logic recognizes by evaluating the drive output rotational speed signal, the fifth classifier KL5 is activated. By means of the fifth classifier KL5 it is assessed whether the scoop is unloaded or loaded. At the same time the classifiers KL7 and KL8 are activated in order to carry out the further assessment whether the working machine is currently ascending a mound or the scoop is full. This classifier selection from the M classifiers KL1 to KLM to be used takes place in the area of function block 110.

For example, if during the training process of the function blocks 200 to 260, out of a total of 100 characteristics M1 to M100 the characteristics M3 and M18 are determined as optimal characteristics and assigned to the fifth classifier KL5, the characteristics M34, M67 and M91 are determined as optimum characteristics and assigned to the seventh classifier KL7, whereas the characteristics M8, M12, M18 and M34 are determined as optimum characteristics and assigned to the eighth classifier KL8, thereafter in function block 120 the respective combination of characteristics required for the activated classifier is extracted from the number of characteristics M1 . . . M100.

From this, for the classifier KL5 the characteristic vector x is obtained from the components x_K5=[x3, x18]T, for the classifier KL7 the characteristic vector x is similarly obtained from the components x_K7=[x34, x67, x91]T and for the classifier KL8 the characteristic vector x is obtained from the components x_K8=[x8, x12, x18, x34]T.

The characteristic variables determined during training, i.e. the support vectors $x_i$ and their category membership $y_i$, the Lagrange factors $\alpha_i$ and the kernel k, are in each case used for the classifiers KL5, KL7 and KL8 respectively for the solution of the separation problem concerned in function block 130, in order to classify the characteristic vectors x_K5, x_K7, x_K8 determined in the control unit. Thus, in function block 130, using equation (3) in each case, for classifier KL5 classification is done with f5(x_K5), for classifier KL7 with f7(x_K7) and for classifier KL8 with classifier f8(x_K8).

For each of the classification results f5, f7, f8 the function block 140 calculates how secure the algorithm has been in the classification of the characteristic vectors. Depending on the result of the calculation in function block 140, in function block 150 the probability is assessed. For example, the determination of a condition change if the probability is low could only take place if the same result is classified several consecutive times, even if only a small probability has been determined for a condition transition. For example, if a clear result is obtained it is possible to make the decision for a condition transition at an earlier time. At the end of function block 150 in any case it is decided which operating condition the working machine is in. With that result, in the following computation cycle the classification begins again.

The above description is based on the assumption that to begin with, the working machine is in the first operating condition Z1. The sequential passage through the function blocks 100 to 150, however, always takes place in that form regardless of which initial operating condition the working machine is actually active in. Depending on the respective active operating condition Z1 to Z8 of the working machine, in each case other classifiers with their combinations of characteristics are activated, computed and evaluated.

The finite automaton shown as an example in FIG. 6 characterizes the various driving conditions Z1 to Z8 of a wheel loader. The transitions between the conditions Z1 and Z8 may be trivial and can then be determined using simple transmission parameters such as rotational speeds, rotation directions, etc. Those transitions which are not trivial are determined with the help of support vector machines. The support vectors are determined offline in a training process, with which the classification takes place in the control unit. In the variant of the procedure according to the invention described in more detail above, a total of nine classifiers KL1 to KL9 are used. Each classifier KL1 to KL9 is trained separately and during the training receives its optimum model. A model is understood to mean the number of calculated support vectors, the Lagrange factors and the associated kernel information. Furthermore, for each classifier the best combination of characteristics is determined offline.

In the control unit the driving situation is then determined online and one or more classifiers are activated as necessary. For each activated classifier, by evaluating the support vectors with the best combination of characteristics in each case, a classification of the driving situation is carried out. Depending on how secure the classifier was during the classification, it is decided whether or not to branch off to a new driving situation.

This makes it possible to determine the current driving situation of the vehicle exclusively from the information available in the transmission.

In the method described above, the general decision whether as the successor stage a change should be made to operating condition A or to operating condition B of the working machine, is reached by the evaluation of support vectors in accordance with equation (3).

Alternatively, the separation line f(x) obtained during the training and represented in the case of linear problems by the support vectors, and in the case of problems having higher dimensions by a separation surface or a hyper-plane, could be stored in the control unit. The decision whether a point to be classified belongs in category A or category B is then made online in the control unit, not by evaluating equation (3), but by the direct evaluation of the characteristic line, separation surface or hyper-plane. When separation planes or separation lines are used, this method can sometimes be more sparing of μC resources, since the non-linear equation (3) does not have to be worked out directly in the control unit.

This alternative variant additionally has recourse to a further function block 270 of the offline training process, in the area of which the best models determined by the SVM-method and the corresponding separation lines are extracted as characteristic lines or fields. Instead of the support vectors, the Lagrange factors $\alpha_i$ and the kernel parameter k, starting from the function block 270 the characteristic lines or fields are stored in the control unit. Then, in function block 130 the online classification in the control unit is carried out by evaluating only the characteristic line, but not by evaluating the SVM-model.

By virtue of this alternative feature the offline training is only used to determine the optimum combination of characteristics for a separation problem and thereafter to store the separation line or surface with the most suitable support points in the control unit, and to evaluate precisely this separation line or surface in the control unit.

The driving of a wheel loader onto a mound is a highly dynamic driving situation. During this the drive output shaft is strongly braked in a very short time. The transmission control system must react to such driving situations with a very rapid increase of the transmission ratio by downshifting the gears. Alternatively, in continuously variable transmissions the transmission ratio must be very rapidly adjusted in the direction of infinity so that, for example, the engine does not stall. Moreover, what usually happens after driving onto a mound is that the scoop is filled. The certain identification of a mound ascent is a clear indication that thereafter work will actually continue on the mound and the scoop will be filled. The information about the filling condition of the scoop, in turn, has far-reaching consequences for the driving strategy. Owing to the high dynamics, it must be possible to reach a decision about a mound ascent very rapidly. However, that only happens by way of the combination of the optimum characteristics for the mound ascent and the best possible determination of the discrimination characteristic.

Figure 8:
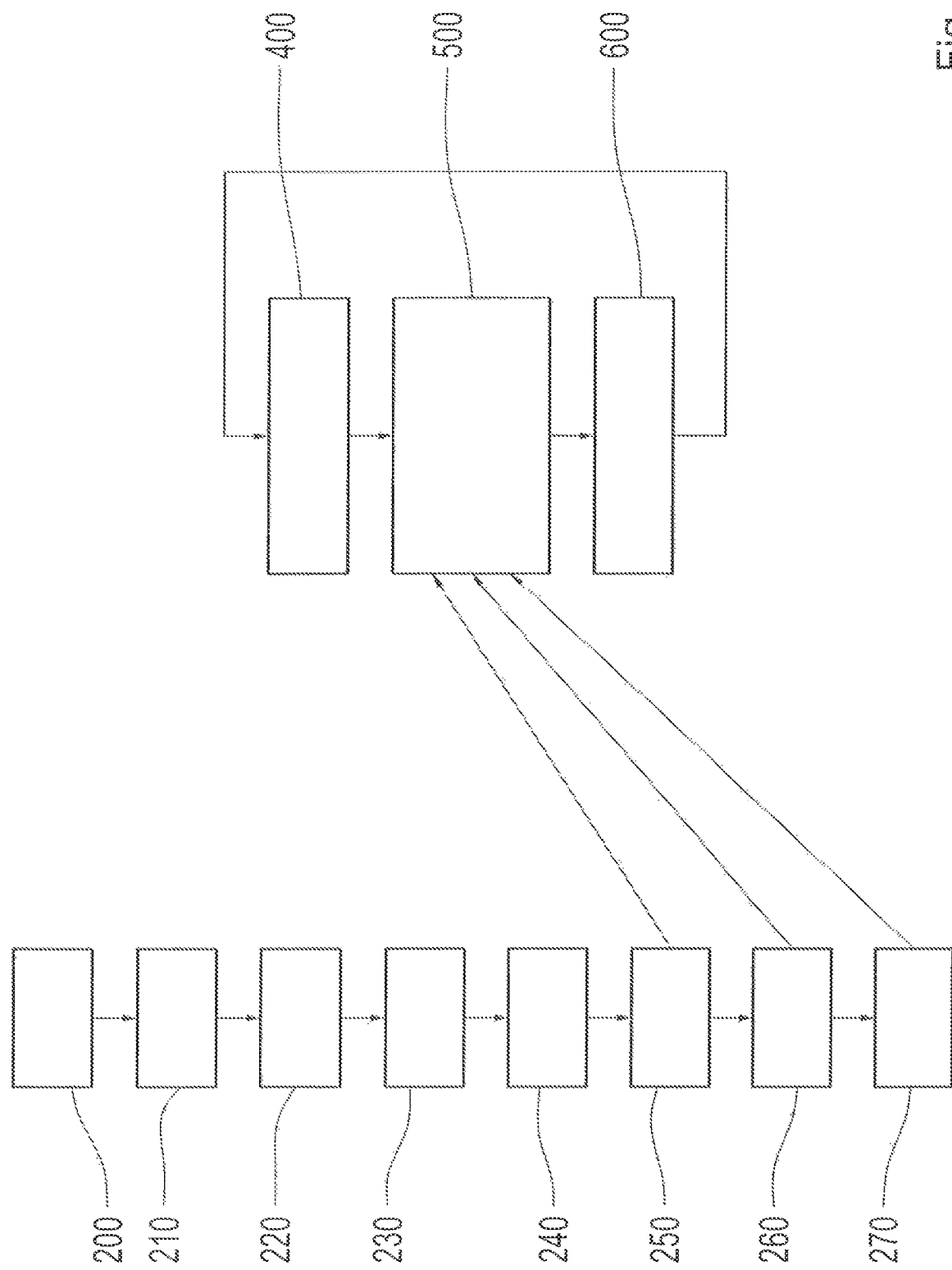
FIG. 8: A block diagram corresponding to FIG. 7, showing another variant of the method according to the invention.

The classification of the mound ascent shown in FIG. 8 can basically also be carried out with the method described earlier purely on the basis of existing measurement data, which are first learned during the offline training in function blocks 200 to 260.

In every real cycle it is first checked in the control unit in a function block 400 whether the activation condition for the classifier has been fulfilled. In function block 500, with reference to characteristics selected during training and transferred into the control unit during the application process, the classification is carried out. Function block 600 contains the logic by means of which the follow-up operating condition of the working machine is determined. Based on this, in the next computation step the classification begins again with function block 400.

Figure 9:
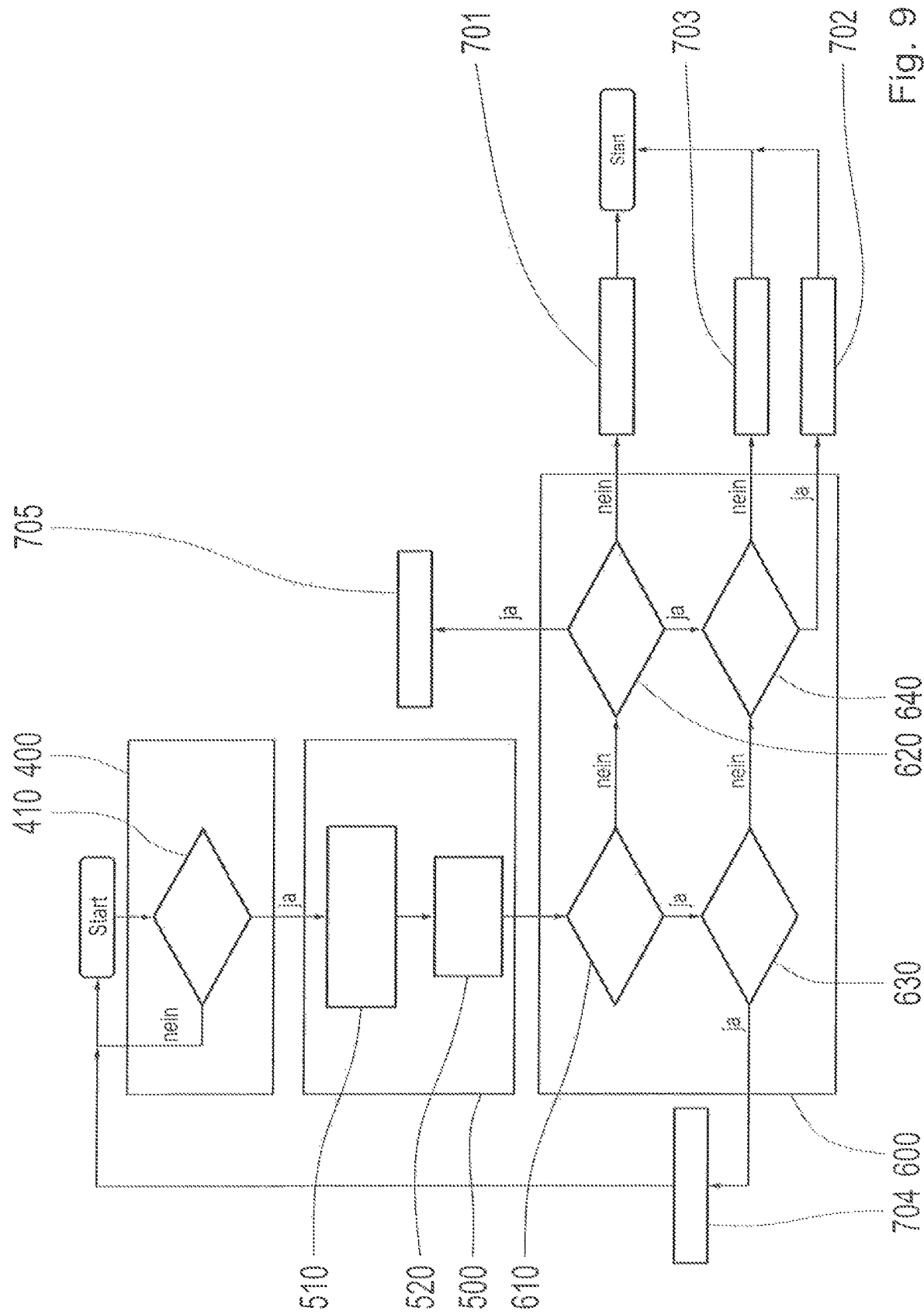

FIG. 9 shows a more detailed block diagram of function blocks 400, 500 and 600, each of which contains respective sub-function blocks 410, 510 and 520, and 610 to 640.

Starting from the beginning of the computation cycle, it is first checked in block 400 whether the activation conditions are fulfilled. During this, in sub-function block 410 the time gradient of the drive output rotational speed sensor signal undergoes a threshold value comparison. If the sometimes negative value of the drive output rotational speed gradient is smaller than a deceleration threshold, this enables the classification to take place in block 500, but otherwise the system branches back to before block 400 and the computation cycle begins again for the next real cycle.

When by way of the sub-function block 410 the classification in function block 500 is activated, in block 500 the microprocessor of the control unit implements the function f(x) with the characteristic vector x determined during training, in accordance with equation (3). The provisional classification result KE then indicates either "mound ascent recognized" or "mound ascent not recognized". In sub-function block 520 this provisional classification result KE is filtered. If N repeated equal classifications occur, then from that the successor stage is calculated in function block 600. If during sub-function block 610 it is recognized that the current classification is a mound ascent and a mound ascent has already earlier been classified in sub-function block 630, the system then branches off to a function block 704 and the last-determined operating condition "mound ascent" is retained.

If in the interrogation 610 it is determined that although the last driving situation was not a mound ascent, in the current cycle the sub-function block 520 has detected a mound ascent, then the current driving situation is changed by way of a function block 705 to the "mound ascent" operating condition. If in the area of the two sub-function blocks 610 and 620 it is determined that neither the old nor the new driving situation is a mound ascent, then the system branches off to a function block 701 and the old driving situation is retained. After that, the system branches back to function block 400 and the computation cycle begins again for the next real cycle.

If the last driving situation was a mound ascent and in the current driving situation no mound ascent has been detected, then the finite automaton changes via function block 702 to the scoop filling operating condition when the confirmation conditions in sub-function block 640 are fulfilled. This is the case when the working machine is barely moving, at a low transmission drive output rotational speed. If the so-termed "mound plausibility test" is not determined promptly in the area of the sub-function block 640, then by way of a further function block 703 the system changes back again to the operating condition that was active before the mound ascent. Thereafter, the system branches back to before the function block 400 and the computation cycle for the next real cycle begins again.

In the procedure described, the decision whether as the successor stage a change to the condition "mound ascent recognized" or "mound ascent not recognized" should take place, is reached by evaluating the support vectors by means of equation (3).

Alternatively, starting from function block 270 the separation line, separation surface or hyper-plane obtained during training and represented by the support vectors could be stored in the control unit. The decision whether a point to be classified belongs to the category "mound ascent recognized" or "mound ascent not recognized" is then made online in the control unit not by evaluating equation (3), but by direct evaluation or the separation line, separation surface or hyper-plane.

As already explained, the vehicle behavior of modern wheel loaders is determined by the loading condition of the scoop. The weight of the total system wheel loader plus scoop changes significantly when the scoop is filled. On the basis of the information whether a wheel loader is driving with its scoop loaded or unloaded, for example the driving strategy can be optimized. For example, the engine rotational speed can be increased if it is known that the scoop is full. Moreover, in the loaded condition of the scoop the probability is small that the driver will drive onto the mound with the wheel loader. Bearing these facts in mind, in some circumstances the downshift conditions when ascending a mound can be adapted appropriately. Such optimizations, by virtue of which on the one hand the driving comfort and on the other hand the fuel consumption can be improved, can be carried out as described in more detail below.

Figure 10:
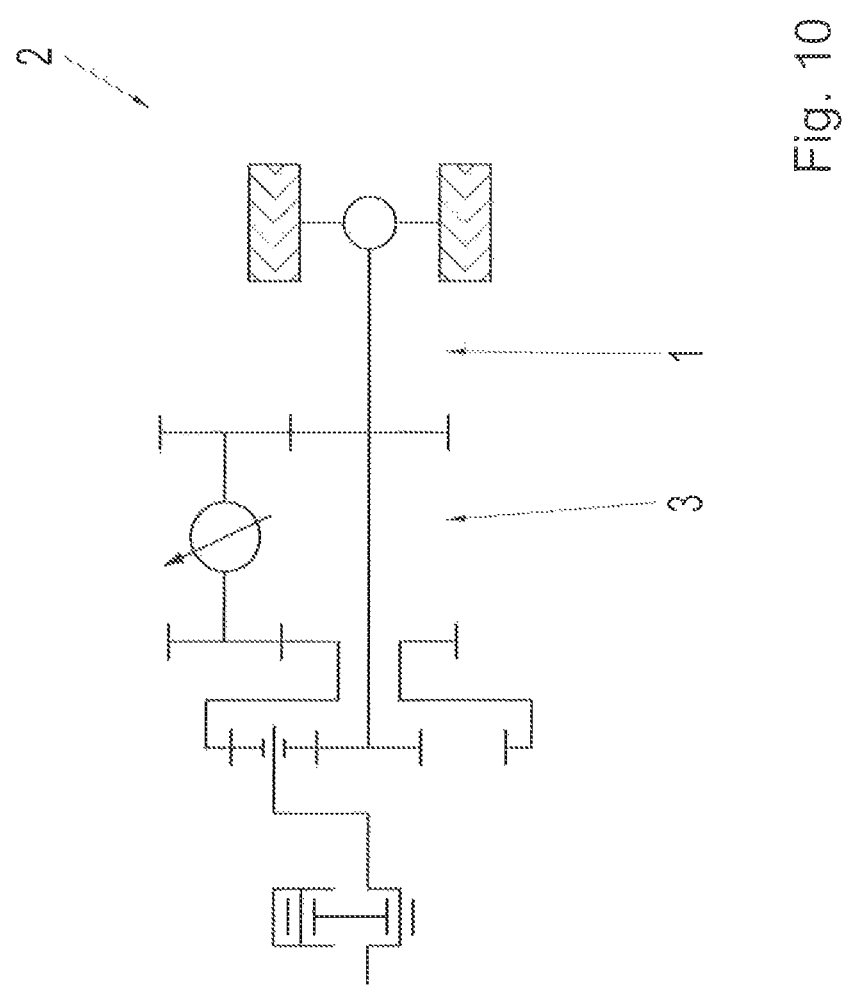
FIG. 10: A very schematic representation of a vehicle drive-train of a working machine having a hydrostatic transmission with continuously variable power splitting.

FIG. 10 shows a schematic representation of a vehicle drive-train 1 of a working machine 2, which comprises a hydrostatic transmission 3 designed with continuously variable power splitting. Basically, owing to the coupling of the transmission 3 on the secondary side, in the case of this vehicle drive-train 1 there is a direct relationship between the maximum hydrostatic pressure measured in the transmission 3 and the traction force produced at the wheel.

If the working machine 2 with its scoop positioned and moved correctly moves forward on a mound, the filling level of the scoop increases along with the distance covered. In this situation the filling of the scoop depends not only on the distance covered, but also on the load imposed from outside. For example, if the vehicle only picks up material from the side of the mound, the scoop is only partially inserted into the mound and compared with a frontal mound ascent, over the same distance covered the scoop will be filled less. However, when removing material from the side the opposing force of the mound is also smaller, so such cases too can be covered by taking the load into account.

Accordingly, it can be assumed that the filling level of the scoop is proportional to the work performed on the mound. The work is defined as the integral of the force exerted along the movement direction from location sa to location se. That force can be divided into infinitesimally small path increments along which the force acts. Mathematically this relationship is reproduced in equation (5) below:

$$W_{s_a-s_e} = \int_{s_a}^{s_e} (F(s)ds) = \lim_{n\to\infty}\left(\sum_{i=1}^{n} F(s_i) * \Delta s_i\right)$$

Each path increment $\Delta s_i$ is equal to the product of the wheel speed $v_i$ and the time increment $\Delta t_i$. In turn, the wheel speed is proportional to the transmission drive output rotational speed $n_{ab}$ multiplied by a constant factor $k_2$, which is a function of the axle transmission ratio and the tire radius. That mathematical relationship is reproduced by equation (6):

$$\Delta s_i = k_2 * \Delta n_{ab} * \Delta t_i$$

The force in the path increment $s_i$ is the measured maximum pressure $p_{HD}$ at time-point $t_i$ at which the path, in the transmission system coupled on the secondary side, multiplied by a proportionality factor $k_1$, was covered:

$$F(s_i) = k_1 * \Delta p_{HD} \qquad \text{Equation (7)}$$

If the path increments and thus ultimately the time increments are small enough, then equation (5) can be developed further as follows:

$$\lim_{n\to\infty}\left(\sum_{i=1}^{n} F(s_i) * \Delta s_i\right) = \qquad \text{Equation (8)}$$

$$\lim_{n\to\infty}\left(\sum_{i=1}^{n} k_1 * p_{HD}(t_i) * n_{ab}(t_i) * \Delta t_i * k_2\right) \approx$$

$$\sum_{i=1}^{n} k_1 * p_{HD}(t_i) * n_{ab}(t_i) * \Delta t_i * k_2 =$$

$$k_1 * k_2 \sum_{i=1}^{n} p_{HD}(t_i) * n_{ab}(t_i) * \Delta t_1$$

Equation (8) establishes the dependence of the work $W(t_i)$ on the time $t_i$:

$$w(t_i) = k_1 * k_2 \sum_{i=1}^{n} p_{HD}(t_i) * n_{ab}(t_i) * \Delta t_i$$

In this case the sum is only evaluated for positive drive output rotational speeds $n_{ab} > 0$.

But if the drive output rotational speed at time $t_i$ is $n_{ab}(t_i) \leq 0$, then the value of the sum at that time-point is set to 0.

Finally, the approximation of the scoop filling level is obtained by multiplying the work by a "filling factor" $C_{Fuell}$. This factor determines what percentage of the scoop has been filled by the corresponding work.

The scoop filling level SFG at time $t_i$ is given by:

$$SFG(t_i) = W(t_i) * C_{Fuell} \qquad \text{Equation (9)}$$

Since in reality a scoop cannot be infinitely full, but the calculated filling level SFG has not previously had an upper limit, this should be limited upward for example to 100%.

Advantageously, the filling factor $C_{Fuell}$ is chosen such that the work to be performed for the complete loading of the scoop corresponds to a filling level of 100%, i.e.:

$$C_{Fuell} = \frac{100}{W(t_{voll})} \qquad \text{Equation (10)}$$

The value $W(t_{voll})$, i.e. the work at time $t_{voll}$ which the scoop is completely full, must for this purpose be determined by driving tests.

In order to obtain a good approximation, certain prerequisites must be in place. When the working machine drives onto the mound the scoop must be in the correct "loading position" so that during the filling process it can be operated properly and loaded to an expectable extent. Furthermore the filling level of the scoop at the beginning of the mound ascent must be known and during the filling process the scoop should not be fully or partially emptied in the meantime. In addition, the selection of the filling factor $C_{Fuell}$ should be adapted to the actual circumstances.

Basically, the above function for estimating the filling level is only used when the vehicle is in the "fill the scoop" driving condition. Indicators for recognizing that condition could be a low drive output rotational speed combined with a high torque at the drive output, and the driver's traction force demand for example by virtue of the accelerator pedal position. Furthermore the determination of the work is discontinued if it is recognized that the scoop is not actively being filled. The correct determination of this condition and the determination of whether the scoop is actively being filled can in turn be carried out in the manner described in more detail earlier.

If a change of the driving condition to "fill the scoop" is called for, the scoop filling level SFG is set to 0 or set to the current value if that is known. Then, so long as the driving condition of the vehicle does not change it is calculated as described earlier.

The above-described procedure for determining the scoop filling level is a simple method which gives a good approximation of the filling level in normal loading processes, since for determining the filling level only two transmission-internal measured values are needed, namely the pressure in the area of the hydrostat and the drive output rotational speed. By means of the method, situations can be taken into account in which the scoop does not move forward into the mound but, for example, the mound is carried away from the side.

With CVT transmissions coupled on the secondary side, the filling level can be determined by the above-described procedure as a function of the pressure of the hydrostat or the drive output torque that depends on it. In this case the work and ultimately the filling level of the scoop can be determined by way of the traction force produced as a function of the drive output torque.

For working machines made with other transmission systems, the drive output torque can be determined either from the product of the engine torque and the transmission ratio currently engaged in the transmission, or from the product of the transmission input torque, if a converter is present the turbine torque, and the transmission ratio currently engaged in the transmission, or as a function of other suitable operating variables, or even determined by measurement methods. If the drive output torque is known, again the traction force can be determined, and from that in turn the work performed and ultimately the filling level of the scoop can be determined.

Recognition of the current driving situation of a wheel loader often depends on the loading condition of the scoop of the loader. Knowledge about the loading condition then allows a better classification of the driving situation as a whole. With this information the driving strategy can be optimized in relation to fuel consumption among other things, because for example the engine rotational speed can be reduced. Moreover, the shifting strategy can be optimized and when appropriate, conclusions can be drawn about what the next working step of the wheel loader will probably be. Is the wheel loader driving slowly toward the unloading point with a full scoop, or more dynamically toward the mound with its scoop unloaded?

Even if it is already possible to recognize whether during a mound ascent the scoop has been loaded, it is helpful to clarify whether before leaving the aggregate mound it has not been emptied again. Thus, among other things it is possible that the driver tips out the already full scoop after driving farther forward, at some other place higher up on the mound. This process is called "piling up". Simple tipping out of the scoop while standing still is also entirely conceivable.

Since no direct information about the operating condition of the working hydraulic system of the working machine is available to the transmission control system, another way must be found to estimate whether the vehicle or its scoop has been filled after driving into the mound. The function for recognizing the scoop filling and for deducing the approximate filling level of the scoop will be explained elsewhere and taken as a given in the rest of this description.

By means of the method described in more detail below, it should now be determined whether at the end of the filling process the scoop has not been emptied again. In this context the end of a scoop-filling process is determined by trivial driving condition changes. In the backward direction this is reversing, while in the forward direction it is when a particular distance has been covered during which no "scoop filling" has been recognized.

To fill the scoop, it has to be thrust as deep as possible into a mound. During the filling process it is then swiveled in more and raised a little, so as to be able to move the vehicle farther in and collect more material in the scoop.

On first being inserted, the scoop is directed horizontally to the ground and during progressive driving into the mound it is increasingly raised and swiveled in. At the end of the mound climb the scoop has been filled and extended far into the mound. Thereafter, the wheel loader usually reverses out of the mound with its scoop full.

The idea for recognizing whether the vehicle is coming directly from a scoop-filling process and has not been unloaded again, is to determine whether the scoop is still in the mound. In such a case, namely, as with the "standard filling" described earlier, the vehicle moves out of the mound by reversing.

In the filling process the vehicle pushes against the mound so that a certain counter-force is built up. Just when the scoop is swiveled in at the end of the process a large scoop area is presented to the mound, on which its force can act. When the driver now calls for a reversal so as to withdraw backward away from the mound, the counter-force gives the vehicle an additional push out of the mound. In this situation the power flow through the transmission is reversed, with the power now flowing from the wheel "backward" through the transmission in the direction of the drive input. In the case of hydrostatic transmissions this is manifested for example in a change on the high-pressure side in the hydrostat, whereas in conventional powershift transmissions this can be verified with reference to characteristic parameters of the drive engine in the form of an internal combustion engine.

This behavior can be distinguished from a normal reversing process or reversing, during which the scoop is not inserted into the mound.

However, evaluating the feature that the power flow has reversed is complicated and cannot be done accurately enough "by hand". The procedure described below is based on a combination of heuristic expert know-how and a learning-based training process carried out offline, by virtue of which the best characteristics are selected and the conditions "scoop inserted into mound/not inserted into mound" are differentiated.

The above-described problems "emptying the scoop" before leaving the mound and "piling up" are solved in the heuristic part of the procedure as follows:

If the vehicle is at rest, the scoop is not being filled any further. However, the driver can empty the scoop more. Since in the normal case there is no reason simply to remain still on the mound, it is assumed that the driver is emptying the scoop. This is determined by a probability increase for the emptying of the scoop over time. Further indications of this are an increase of the engine rotational speed and an increased engine torque despite the fact that the vehicle is standing still. So that this assumption will not have too much influence, a slight probability variation per second of standstill time is now carried out, which however can be increased as a function of engine rotational speed and engine torque.

If the vehicle drives forward and the scoop is also filled, this driving situation is recognized by the corresponding function. But if no filling of the scoop is recognized it is possible, for example, that the driver is piling up the mound and therefore emptying the scoop again. During the so-termed mound piling, the driver first fills the scoop and then tips out the material higher up the mound. However, the tipping out cannot be recognized from the working hydraulic system without further information. But in the normal case, for the driver there is no reason to drive farther up the mound with the scoop full, except that he wants to empty the scoop again.

For that reason it is assumed that after a certain distance has been covered during which no scoop filling has been detected, the scoop has been totally or partially emptied. This is determined by a probability increase for the emptying of the scoop over the distance covered.

When the scoop-filling process in the reverse direction has ended, the approximate filling level is calculated with the determined probability that the scoop has been emptied again. From this a new probability is obtained for the loading condition or filling level of the scoop. However, this does not apply if the process has ended in the forward direction. In that case the previously detected filling level of the scoop is simply retained.

To recognize whether the scoop is inserted into the mound, a classifier from the learning-based part of the procedure is used. As the classification mechanism for discriminating between "scoop inserted into mound/scoop not inserted in to mound", for example the SVM-method is used again. In a training process the best combination of characteristics is first determined, with which the problem can be solved. Besides the best combination of characteristics for solving the problem, by means of the SVM-method in the manner described earlier the best possible separation line, separation surface or hyper-plane between the categories to be classified is again calculated.

Figure 11:
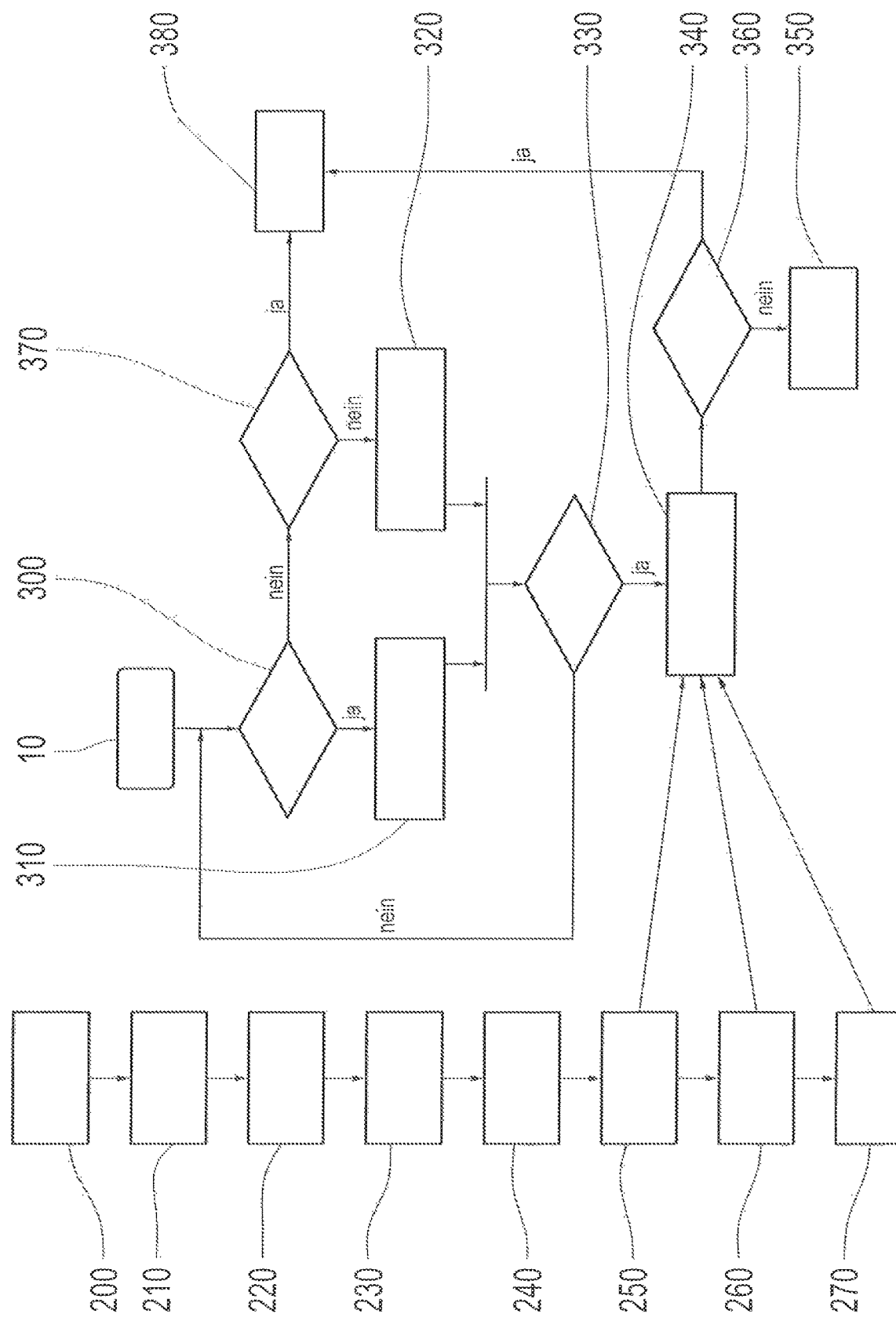
FIG. 11: A block representation corresponding to FIG. 7, showing a further variant of the method according to the invention.

The training process to be carried out by way of the function blocks 200 to 260 shown in FIG. 11 corresponds essentially to the training process described in relation to FIG. 7, so regarding this reference should be made to the description concerning FIG. 7.

The best combination of characteristics determined and the characteristic variables of the model are stored in the control unit and then used online in the control unit for the evaluation.

Starting from a mound ascent with known scoop filling probability, the system branches from a function block 10 to a function block 300, in the area of which at the beginning of each computation cycle it is checked whether the vehicle is at rest. If so, then in function block 310 a probability is determined, with which the scoop has been unloaded while at rest. The probability of this increases with increasing time spent at rest. If the working machine is moving, then in a further function block 370 it is determined whether the mound ascent ended while driving in the forward direction. If the result of that interrogation is positive, then the scoop filling probability stored in function block 10 is adopted.

If the mound ascent has not yet ended, then in the area of a function block 320 a probability is determined, with which the scoop has been unloaded while driving forward. The probability of the scoop being unloaded increases with the distance covered. Thereafter, in function block 330 it is checked whether the mound ascent has ended with the initiation of a reversing process. If not, the vehicle is still on a mound ascent and the cycle begins by checking whether the vehicle is at rest, in the next computation step in the area of function block 300 as before. If the mound ascent has been terminated by reversing, function block 340 is carried out and the classifier for determining "scoop inserted into mound" comes into use. If the classifier decides on the basis of equation (3) by means of function block 360 that the scoop is still inserted into the mound, the scoop filling probability of function block 10 is adopted.

If by way of the classifier it is determined that the scoop is not inserted into the mound, the scoop filling probability stored in function block 10 is changed. This takes place by a scaling with the probabilities that the scoop has been unloaded again, which were determined in function blocks 110 and 120.

The last-described procedure is a simple function which uses only one classifier and by way of which a probability is calculated. Although there is no information about the current operating condition of the working hydraulic system of the working machine, the procedure can yield information about whether the scoop is full. If the scoop and hence also the working machine is pushed back from the mound during the filling process and/or if there is little time between the previous filling process and the reversing that comes after it, then by virtue of this procedure desirably accurate information about the loading condition of the scoop can be determined.

Alternatively it is again possible, instead of via equation (3), to store the separation line, separation surface or hyperplane obtained during offline training in function blocks 200 to 260 and represented by the support vectors, in the control unit. The decision whether a point to be classified belongs in the category "scoop inserted in mound" or "scoop not inserted in mound" is then made online by the control unit, not by evaluating equation (3) but by direct evaluation of the characteristic line. For this the offline process is extended by the further function block 370 by means of which from the best models of the SVM-method determined, the corresponding separation lines are extracted as characteristic lines or fields.

Figure 12:
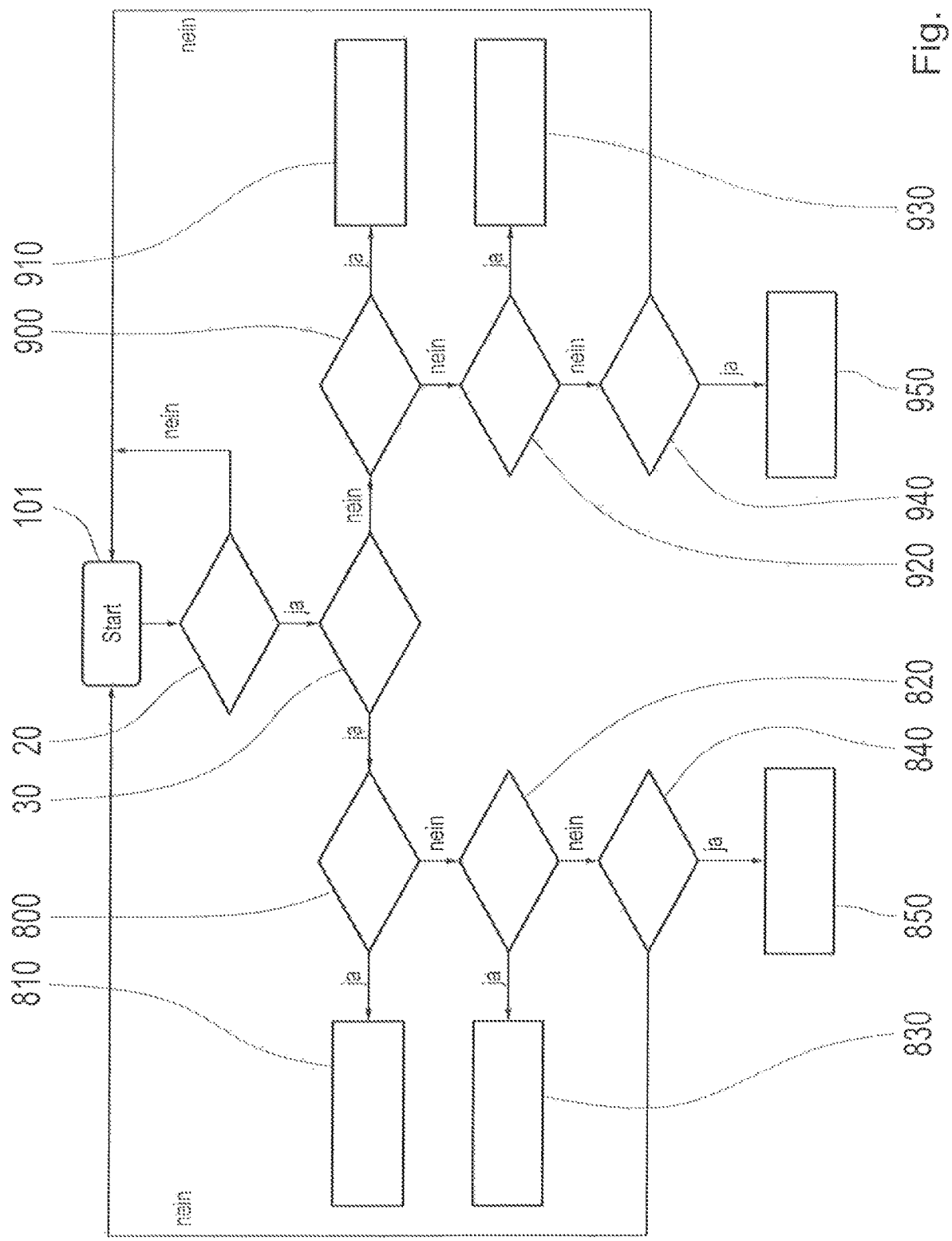
FIG. 12: A block diagram of part of a further variant of the method according to the invention.

FIG. 12 shows a schematic block diagram representation of a further variant of the method according to the invention carried out online, by means of which during particular driving situations a loaded or unloaded operating condition of a scoop can be determined with reference to operating variables of the transmission and if necessary further components of a drive-train of a working machine.

For this, first of all the current driving situation is determined correctly on the basis of simple measurement signals. If a suitable enough driving situation persists for a long enough time, the classification for the loaded or unloaded operating condition of the scoop can take place correctly using certain particular characteristics. In this case the combination of characteristics is determined by machine learning methods in a training process such as that described in detail with reference to FIG. 7, by way of the function blocks 200 to 260 or 270. Besides the best combination of characteristics for solving the problem, by means of the SVM-method the best possible separation line, separation surface or hype-plane is also determined.

Starting from the beginning of any computation cycle, after function block 101 it is first determined by way of a function block 20 whether a gear is engaged in the transmission. If not, then from function block 20 the system branches directly back to function block 101. If a gear is engaged in the transmission of the working machine, then in a further function block 30 the direction in which the transmission output is rotating is checked. This can be done for example by evaluating the sign of the drive output rotational speed sensor or even by evaluating the currently engaged shifting elements, such as a driving direction clutch.

If in the area of the function block 30 forward driving is detected, then in a function block 800 it is checked whether a reversing process has just begun. If the result of the check in function block 800 is positive, the classifier for evaluating the driving situation "forward driving and reversing" is activated in function block 810. In function block 810, if the driving situation exists, it is decided whether the vehicle is loaded or unloaded.

If in the area of function block 800 no reversing is detected, a function block 820 checks whether the working machine has been operated in a steady acceleration mode for a certain time, which has exceeded a first, lower threshold. A steady acceleration is a condition in which for a substantial period there has been no substantial reduction of the acceleration of the working machine. If a steady acceleration is recognized, the classifier of the function block 830 for evaluating the driving situation "forward driving and steady acceleration" is activated. In function block 830 it is then decided whether the vehicle is loaded or unloaded.

If no steady acceleration is determined in the area of function block 820, the system branches off to a function block 840 where it is checked whether a steady deceleration of the working machine has been taking place for a certain time, which quantitatively exceeds a second lower threshold. A steady deceleration is a driving situation in which the quantitative deceleration does not decrease for a substantial time. If a steady deceleration is recognized, the classifier of function block 850 for evaluating the driving situation "forward driving and steady deceleration" is activated. In function block 850 it is decided for this driving situation whether the vehicle is loaded or unloaded. If in function block 840 no steady deceleration is recognized, the system branches back to function block 101.

If function block 30 decides that driving in reverse is taking place, then in function block 900 it is checked whether the reversing has just begun. If the result of this check in function block 900 is positive, function block 910 is implemented and the classifier for evaluating the driving situation "driving backward and reversing" is activated. In this driving situation, it is decided in function block 910 whether the vehicle is loaded or unloaded.

If in the area of function block 900 no reversing is recognized, then function block 920 checks whether a steady acceleration has been taking place for a certain time, which acceleration quantitatively exceeds a third lower threshold. A steady acceleration is a condition in which for a substantial time there has been no quantitative reduction of the acceleration of the working machine. If a steady acceleration of the working machines is recognized, the classifier of function block 930 for evaluating the driving situation "reversing and steady acceleration" is activated. In function block 930 in this driving situation it is decided whether the vehicle is loaded or unloaded.

If in the area of function block 920 no steady acceleration is recognized, then in a function block 940 it is checked whether for a certain time there has been a steady deceleration of the working machine, which quantitatively exceeds a fourth lower threshold. A steady deceleration is a driving situation in which the quantitative deceleration of the working machine does not decrease for a substantial time. If a steady deceleration is recognized, the classifier of function block 950 is activated and the driving situation "driving in reverse and steady deceleration" is checked. In the area of function block 950, in this driving situation it is decided whether the vehicle is loaded or unloaded. If in the area of function block 940 no steady deceleration is recognized, the system branches back to function block 101.

Basically, the training that precedes online classification is carried out offline, such that in function block 200 the driving situation is determined, in which the classifiers 810, 830, 850, 910, 930 950 are anyway used as necessary. In most cases, for this certain easily measurable signals available in the transmission are used. In the specific case of classifier 810, the start of reversal, namely a shift from forward to backward is used for this.

In the next step, or in the area of function block 210 of the training process, out of all the measurements those data are extracted which in the area of function block 200 are used anyway to determine the driving situation. Specifically, for classifier 810 this is the first reversing step until the actual direction change has taken place. These data are assigned to the appropriate category among the categories to be classified. The remainder of the measurements are ignored.

The best combination of characteristics and the characteristic parameters of the model are stored in the control unit for each classifier 810, 830, 850, 910, 930, 950, and then used online in the control unit for the evaluation. For all the classifiers 810, 830, 850, 910, 930, 950 the training and application steps are carried out individually.

Figure 13:
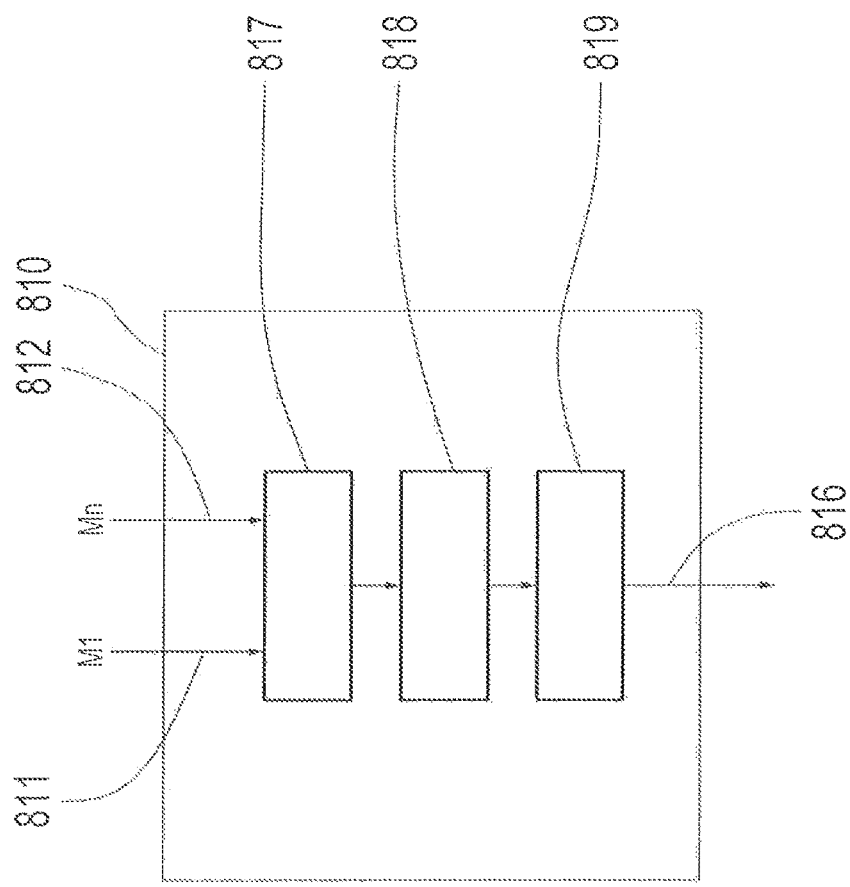
FIG. 13: A detailed representation of a functional block of the online driving situation determining mode of the variant according to FIG. 12.

As shown in FIG. 13 with reference to the classifier 810 as an example for all the classifiers 810, 830, 850, 910, 930, 950, the best characteristics 811, 812 determined in the training process and transferred into the control unit during the application process represent input variables of function block 810 and its sub-function blocks 817. In the area of the sub-function blocks 817 equation (3) is evaluated and for the result of that calculation, in the area of the sub-function blocks 818 a probability respectively for the classification of the conditions loaded and unloaded is determined.

In the area of the sub-function block 819 this probability is assessed and the final classification 816 is established. In the case of a "small probability advantage" of a category this can mean that the result of f(x) should be confirmed several times thereafter before the final classification 816 takes place. If the category has a "clear probability advantage", the classification value is adopted earlier and does not therefore have to be confirmed so often.

This online classification described with reference to the classifier 810 also applies correspondingly for the classifiers 830, 850, 910, 930 and 950. For the classifier concerned, the function f(x) is applied with the combination of characteristics determined during training for that classifier and the corresponding model of support vectors, Lagrange factors $\alpha_i$ and kernel size $\sigma$.

Alternatively, again the separation line, separation surface or hyper-plane obtained during the training carried out offline and represented by the support vectors can be stored in the control unit. The decision whether a point to be classified belongs in the category "loaded" or "unloaded" is then made in the control unit not by evaluating equation (3) in the area of sub-function blocks 817, but by direct evaluation of the characteristic line, separation surface or hyper-plane.

INDEXES

1 Vehicle drive-train
2 Working machine
3 Transmission, hydrostatic transmission
10, 20, 30 Function block
100 to 150 Function block
200 to 270 Function block
300 to 380 Function block
400 Function block
410 Sub-function block
500 Function block
510, 520 Sub-function block
600 Function block
610 to 640 Sub-function block
701 to 705 Function block
800 to 850 Function block
811, 812 Characteristic
816 Classification
817 to 819 Sub-function block
900 to 950 Function block
f(x) Separation line
F1 Recognition or activation function
F2 to F5 Function block
FFZ Final driving condition
KE Classification result
$K_i$ Model
KL1 to KL9 Classifier
M1 to Mn Characteristic, operating variable
SVM Support Vector Machine
w Weighting vector
Z1 to Z8 Operating condition of the working machine

The invention claimed is:

1. A method for controlling a working machine while the working machine is in operation, the method comprising:
   determining operating conditions of the working machine using one or more sensors and a control unit, wherein the operating conditions comprise driving forward without a load; driving into a mound to get a load; filling a scoop; driving in reverse with the load; driving forward with the load; emptying the scoop; and driving in reverse without the load;
   determining the operating conditions by a classifier generated by a machine learning process by way of which, during the operation of the working machine, particular values of at least one operating variable of the vehicle drive-train are sensed by the one or more sensors and assigned to predefined categories, each of which represents at least one of the operating conditions of the working machine;

wherein the operating variables include a transmission drive output torque, a transmission drive input torque, a transmission input rotational speed, a transmission drive output rotational speed, a drive output rotational speed gradient, an engine torque of the vehicle drive-train of the working machine, a gear ratio engaged in the transmission, a gear ratio change, a rotational speed change within the transmission, a rotational direction of transmission components, and a shift condition of shifting elements of the transmission;

wherein the classifier comprises either a loaded or an unloaded operating condition of the scoop of the working machine while either driving in reverse or driving forward at a beginning of a reversing process, during at least one of a steady acceleration phase and a steady deceleration phase;

determining a classification model that carries out an optimized division of empirical values into the predefined categories, via a control unit, in the case of a non-linear separation problem, in accordance with a relationship expressed as:

$$f(x) = \sum_{i=1}^{N} y_i \alpha_i k(x_i, x) + b$$

in the case of a linear separation problem, in accordance with a relationship expressed as:

$$f(x) = \sum_{i=1}^{N} y_i \alpha_i x_i * x + b$$

in which:
k($x_i$, x)=Kernel,
$y_i$=Category membership of the training datum,
x=Value to be classified online,
$x_i$=Support vector,
N=Number of support vectors,
α=Lagrange factor, and
b=Bias;

determining and then evaluating for the classification carried out by the classifier, a probability, and as a function of the evaluation of the probability, a final assignment of the value of the operating variable of the vehicle drive-train to one of the predefined categories is carried out;

determine the probability of a condition change for the working machine; and controlling the working machine to reduce fuel consumption, wherein controlling the working machine includes shifting gears, increasing or decreasing the rotational speed of the engine, and modifying the activity condition of a working hydraulic system based on the probability of the condition change for the working machine.

2. The method according to claim 1, further comprising:
empirically assigning determined values of the at least one of the operating variables that characterize the respective operating conditions to be determined while the working machine is in operation, to predefined categories that correspond to the operating conditions to be determined, and determining the classifier by the machine learning process on a basis of empirical classification of the values.

3. The method according to claim 1, further comprising using a Support-Vector-Machine method as the machine learning process for determining the classifier.

4. The method according to claim 3, further comprising, via the Support-Vector-Machine method and as a function of the empirical values for the classifier, determining a combination of characteristics of operating variables of the drive-train, by virtue of which a division of the empirical values into the predefined categories can be carried out in an optimized manner by a classification model.

5. The method according to claim 4, further comprising storing, in a non-volatile memory of the control unit, the combination of characteristics determined and the characteristic variables of the support vectors representing the classification model, including a category membership, Lagrange factors and a kernel variable representing the model.

6. The method according to claim 4, further comprising storing, in a non-volatile memory of the control unit, the combination of characteristics determined and one of a separation line, a separation surface, and a hyper-plane determined by the Support-Vector-Machine method.

7. The method according to claim 3, further comprising taking into account wrong classifications by displacing limits, determined by the Support-Vector-Machine method, between the predefined categories.

8. The method according to claim 1, further comprising activating the classifier during the operation of the working machine as a function of a defined driving situation of the working machine.

9. The method according to claim 1, further comprising determining, by way of the classifier, insertion of the scoop of the working machine designed with a wheel loader function into the mound.

10. The method according to claim 1, further comprising determining by way of the classifier filling of the scoop in the mound.

11. The method according to claim 1, further comprising determining a loading condition of the scoop, after leaving the mound, by way of the classifier.

12. The method according to claim 1, further comprising if an unloaded condition of the scoop is recognized at the same time as the working machine is driving forward, activating classifiers, by which during one of an acceleration, a deceleration and during a reversing process of the working machine it can be checked whether the scoop is in either an unloaded or a loaded condition, and if the loaded operating condition of the scoop is recognized, the operating condition of the working machine classified as unloaded is reclassified as loaded.

13. The method according to claim 1, further comprising if an unloaded condition of the scoop is recognized at the same time as the working machine is driving forward, activating classifiers in order to either detect whether during the forward driving the scoop is inserted into the mound or whether a filling process of the scoop of the working machine is taking place during such a forward-driving mound movement.

14. The method according to claim 1, further comprising, when a forward movement of the working machine onto the mound is recognized, constantly checking this operating condition by an activated classifier, and by a further activated classifier, again with reference to the values of the at least one operating variable of the drive-train of the working machine, monitoring whether loading of the scoop is occurring.

15. The method according to claim 14, further comprising if a loading process of the scoop is recognized while the working machine is driving forward, activating classifiers in order to either detect whether the scoop is still being loaded in the forward direction or whether the filling process has been terminated by reversing, and the scoop is either loaded or unloaded.

16. The method according to claim 14, further comprising, if a loading process of the scoop is recognized while the working machine is driving forward, activating classifiers in order to either detect whether the scoop is still being loaded in the forward direction or whether the filling process in the forward direction has ended and the scoop is either loaded or unloaded.

17. The method according to claim 1, further comprising, if the scoop is recognized as loaded while the working machine is reversing, activating classifiers in order to either check whether the scoop is actually loaded, or to determine whether during one of acceleration, deceleration and a reversing process of the working machine the scoop of the working machine is in an unloaded operating condition.

18. The method according to claim 1, further comprising if the scoop is recognized as loaded while the working machine is driving forward, activating classifiers in order to either:
check during one of acceleration, deceleration, and a reversing process of the working machine whether the scoop is actually loaded, or
determine during one of the acceleration, the deceleration, and the reversing process of the working machine whether the scoop of the working machine is in an unloaded operating condition.

19. The method according to claim 1, further comprising, if the scoop is recognized as loaded while the working machine is driving forward, activating classifiers in order to check during acceleration, during deceleration or during a reversing process of the working machine, whether the scoop is actually loaded, and in order to ether determine whether the working machine is being operated in the forward driving direction with the scoop loaded or whether loading of the scoop is occurring.

20. The method according to claim 1, further comprising, if the scoop is recognized as loaded while the working machine is driving forward, activating classifiers so that if a reversing process of the working machine is determined, unloading of the scoop is recognized.

21. The method according to claim 1, further comprising, if the scoop is recognized as unloaded while the working machine is driving in reverse, activating classifiers in order to check whether the scoop is actually unloaded, and to determine whether one of acceleration, deceleration and a reversing process of the working machine with the scoop loaded is occurring.

22. A working machine comprising:
a drive engine,
a transmission,
one or more sensors, and
a vehicle drive-train comprising a drive output, and at least one control unit, which is designed to determine operating conditions of the working machine, wherein the operating conditions comprise driving forward without a load; driving into a mound to get a load; filling a scoop; driving in reverse with the load; driving forward with the load; emptying the scoop; and driving in reverse without the load; and
the operating conditions being determined by a classifier generated by a machine learning process, by which values of at least one operating variable of the vehicle drive-train sensed by the one or more sensors, determined while the working machine is operating, can be assigned to respective predefined categories which in each case represent at least one operating condition of the working machine and a classification model that carries out the optimized division of empirical values into predefined categories, via the control unit, to control the transmission of the vehicle drive-train to reduce fuel consumption of the vehicle,
wherein the at least one operating variable is selected from the group consisting of transmission drive output torque, transmission drive input torque, transmission input rotational speed, transmission drive output rotational speed, drive output rotational speed gradient and engine torque of the vehicle drive-train of the working machine, and a gear ratio engaged in the transmission and a gear ratio change, rotational speed changes within the transmission, rotational directions of transmission components, and shift conditions of shifting elements of the transmission;
wherein the classifier comprises either a loaded or an unloaded operating condition of the scoop of the working machine while either driving in reverse or driving forward at a beginning of a reversing process, during at least one of a steady acceleration phase and a steady deceleration phase;
in the case of a non-linear separation problem, in accordance with a relationship expressed as:

$$f(x) = \sum_{i=1}^{N} y_i \alpha_i k(x_i, x) + b$$

in the case of a linear separation problem, in accordance with a relationship expressed as:

$$f(x) = \sum_{i=1}^{N} y_i \alpha_i x_i * x + b$$

in which:
$k(x_i, x)$=Kernel,
$y_i$=Category membership of the training datum,
$x$=Value to be classified online,
$x_i$=Support vector,
N=Number of support vectors,
α=Lagrange factor, and
b=Bias.

* * * * *